US012688832B2

(12) United States Patent
An et al.

(10) Patent No.: US 12,688,832 B2
(45) Date of Patent: Jul. 21, 2026

(54) CIRCUIT FOR SELECTIVELY REFRESHING DIFFERENT REGIONS OF A DISPLAY SCREEN, AND DISPLAY SCREEN AND ELECTRONIC DEVICE

(71) Applicant: Honor Device Co., Ltd., Shenzhen (CN)

(72) Inventors: Yabin An, Shenzhen (CN); Linhong Han, Shenzhen (CN); Haiming He, Shenzhen (CN); Mingyuan Zhao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 18 days.

(21) Appl. No.: 18/844,728

(22) PCT Filed: Apr. 13, 2023

(86) PCT No.: PCT/CN2023/088032

§ 371 (c)(1),
(2) Date: Sep. 6, 2024

(87) PCT Pub. No.: WO2024/007666

PCT Pub. Date: Jan. 11, 2024

(65) Prior Publication Data

US 2025/0182701 A1 Jun. 5, 2025

(30) Foreign Application Priority Data

Jul. 4, 2022 (CN) ........................ 202210777090.X

(51) Int. Cl.
*G09G 3/3266* (2016.01)
*G09G 3/36* (2006.01)
(Continued)

(52) U.S. Cl.
CPC ......... *G09G 3/3266* (2013.01); *G09G 3/3677* (2013.01); *G09G 3/20* (2013.01);
(Continued)

(58) Field of Classification Search
CPC ...... G09G 3/20; G09G 3/3208; G09G 3/3266; G09G 3/3677; G09G 2300/0814;
(Continued)

(56) References Cited

U.S. PATENT DOCUMENTS

2007/0188431 A1* 8/2007 Sato ..................... G09G 3/3677 345/90
2008/0036706 A1* 2/2008 Kitazawa ............. G09G 3/3266 345/76
(Continued)

FOREIGN PATENT DOCUMENTS

CN 101196632 A 6/2008
CN 101840681 A 9/2010
(Continued)

*Primary Examiner* — Adam J Snyder
(74) *Attorney, Agent, or Firm* — Slater Matsil, LLP

(57) ABSTRACT

This application provides a driving signal output circuit, a screen driving circuit, a display screen, and an electronic device. An input end of an N-type output circuit is coupled to a row scan driver. A row address selection signal is inputted to a control end of the N-type output circuit. An output end of the N-type output circuit is coupled to a horizontal scan line. When the row address selection signal is active, the N-type output circuit outputs a row scan signal, to be specific, drives a corresponding pixel row to update corresponding content data. When a row address selection signal outputted by a DDIC is inactive, the N-type output circuit outputs an inactive signal.

19 Claims, 17 Drawing Sheets

(51) Int. Cl.
*G09G 3/20* (2006.01)
*G09G 3/3208* (2016.01)

(52) U.S. Cl.
CPC ... *G09G 3/3208* (2013.01); *G09G 2300/0814* (2013.01); *G09G 2310/02* (2013.01); *G09G 2310/0202* (2013.01); *G09G 2310/0264* (2013.01); *G09G 2310/0283* (2013.01); *G09G 2310/04* (2013.01); *G09G 2320/0252* (2013.01); *G09G 2330/021* (2013.01)

(58) Field of Classification Search
CPC ....... G09G 2310/02; G09G 2310/0202; G09G 2310/0264; G09G 2310/0283; G09G 2310/04; G09G 2320/0252; G09G 2330/021
See application file for complete search history.

(56) References Cited

U.S. PATENT DOCUMENTS

| | | | | |
|---|---|---|---|---|
| 2008/0136964 | A1 | 6/2008 | Yamazaki | |
| 2012/0133392 | A1* | 5/2012 | Wang | G09G 3/3677 327/109 |
| 2013/0293529 | A1* | 11/2013 | You | G09G 3/3611 345/212 |
| 2015/0243237 | A1* | 8/2015 | Li | G09G 3/3677 377/64 |
| 2018/0293943 | A1 | 10/2018 | Hong et al. | |
| 2021/0110767 | A1 | 4/2021 | Xilin | |
| 2021/0110774 | A1 | 4/2021 | Heon et al. | |
| 2021/0335180 | A1 | 10/2021 | Sun | |
| 2022/0327999 | A1 | 10/2022 | Choi et al. | |
| 2023/0260462 | A1* | 8/2023 | Chen | G09G 3/3266 345/214 |
| 2024/0221587 | A1 | 7/2024 | Shen et al. | |

FOREIGN PATENT DOCUMENTS

| | | | |
|---|---|---|---|
| CN | 104123906 | A | 10/2014 |
| CN | 105573547 | A | 5/2016 |
| CN | 106935217 | A | 7/2017 |
| CN | 107958655 | A | 4/2018 |
| CN | 109767726 | A | 5/2019 |
| CN | 209708608 | U | 11/2019 |
| CN | 110910828 | A | 3/2020 |
| CN | 112231036 | A | 1/2021 |
| CN | 113554970 | A | 10/2021 |
| CN | 114424275 | A | 4/2022 |
| EP | 4398232 | A1 | 7/2024 |
| JP | 2003108095 | A | 4/2003 |
| JP | 2010134135 | A | 6/2010 |

* cited by examiner

CIRCUIT FOR SELECTIVELY REFRESHING DIFFERENT REGIONS OF A DISPLAY SCREEN, AND DISPLAY SCREEN AND ELECTRONIC DEVICE

CROSS-REFERENCE TO RELATED APPLICATIONS

This application is a National Stage of International Application No. PCT/CN2023/088032, filed on Apr. 13, 2023, which claims priority to Chinese Patent Application No. 202210777090.X, filed on Jul. 4, 2022, both of which are hereby incorporated by reference in their entireties.

TECHNICAL FIELD

This application relates to the field of display screen technologies, and in particular, to a driving signal output circuit, a screen driving circuit, a display screen, and an electronic device.

BACKGROUND

In recent years, organic light-emitting diode (organic light-emitting diode, OLED) display panels are widely used in electronic products due to advantages such as a bright color, a high contrast ratio, and a high response speed.

A current mainstream method for driving an OLED screen is scan driving. All TFTs on corresponding horizontal scan lines are driven to be turned on in a sequence from the first line to the end line (or from the end line to the first line), so that a data signal is linearly written to a pixel circuit under the driving of a row scan signal, to implement content refreshing on the entire screen. However, in a scenario in which only displayed content in a part of regions on the screen needs to be refreshed, content refreshing still needs to be performed on the entire screen. This inevitably results in high power consumption and a long delay in refreshing the screen content.

SUMMARY

In view of this, this application provides a driving signal output circuit, a screen driving circuit, a display screen, and an electronic device, to resolve at least some of the foregoing problems, and discloses the following technical solutions.

According to a first aspect, this application provides a driving signal output circuit, used in a display screen. The display screen includes a pixel array and an array driving circuit. The array driving circuit includes a row scan driving circuit. The row scan driving circuit generates a row scan driving signal for driving a pixel row in the pixel array. An input end of the driving signal output circuit is connected to an output end of the row scan driving circuit. A control end of the driving signal output circuit receives a row address selection signal. A row scan signal is inputted to an output end of the driving signal output circuit. When the row address selection signal is active, the driving signal output circuit outputs the row scan driving signal. The row address selection signal is generated, based on a pixel row with a changed display state, by an integrated circuit that has a memory and that is coupled to the display screen. When the row address selection signal is inactive, the driving signal output circuit outputs a low-level signal.

In the driving signal output circuit provided in this solution, when the inputted row address selection signal is active, the row scan signal is outputted; and when the row address selection signal is inactive, an N-type output circuit outputs a write inactivate signal. Refresh of displayed content in a region whose content is to be updated is carried out by using the driving signal output circuit, without refreshing displayed content in a picture holding region. To be specific, in this solution, refresh of displayed content is carried out at different refresh frequencies based on refresh requirements of different display regions on the display screen, but not at a same refresh frequency on the entire screen, so that power consumption of the screen is reduced. In addition, corresponding pixel rows are driven based on requirements, without needing to perform progressive scanning in sequence, so that a display delay is reduced, thereby effectively reducing a feedback delay of an IO device such as an active stylus.

In a possible implementation of the first aspect, the driving signal output circuit includes a selection circuit and an output circuit. An input end of the selection circuit is connected to the output end of the row scan driving circuit. A control end of the selection circuit receives the row address selection signal. An output end of the selection circuit is connected to an input end of the output circuit. The selection circuit is configured to: output a pulse signal having a frequency the same as that of the row scan signal when the row selection address signal is active; and output a constant-level signal when the row selection signal is inactive. The output circuit is configured to: generate a write driving signal having a driving capability based on the pulse signal and output the write driving signal, or output a constant negative voltage signal based on the constant-level signal.

In another possible implementation of the first aspect, the selection circuit includes a load circuit and a signal latch circuit. The load circuit includes a first voltage division bridge arm and a second voltage division bridge arm. The row address selection signal is inputted to an input end of the signal latch circuit, and a signal of an output end is held as the signal inputted from the input end. The first voltage division bridge arm has one end to which a positive voltage signal is inputted and another end that is connected to the output end of the signal latch circuit. The second voltage division bridge arm is connected in parallel to the first voltage division bridge arm. A common node of an upper transistor and a lower transistor of the second voltage division bridge arm is connected to the input end of the output circuit. The row scan signal is inputted to a control terminal of the lower transistor.

In this solution, the row address selection signal remains a stable state by using the signal latch circuit. Whether the load circuit operates depends on an output signal of the signal latch circuit. When the signal latch circuit outputs a low-level signal, the load circuit may operate normally. In this case, an output end of the load circuit outputs the inputted row scan signal (the pulse signal). Further, the pulse signal is outputted to a next circuit through the output circuit. When the signal latch circuit outputs a high-level signal, the load circuit does not operate. In this case, the load circuit outputs a high-level signal, and the high-level signal is converted into a low-level signal through the output circuit. The driving signal output circuit provided in this solution can operate in a stable manner, without being affected by another circuit node.

In still another possible implementation of the first aspect, the first voltage division bridge arm includes a first switching transistor and a third switching transistor that are connected in series. A first terminal of the first switching transistor is connected to a second terminal of the third switching transistor. A positive voltage signal is inputted to a second terminal of the first switching transistor. A control terminal of the first switching transistor is connected to the first terminal of the first switching transistor. A first voltage signal is inputted to a control terminal of the third switching transistor. The second voltage division bridge arm includes a second switching transistor and a fourth switching transistor that are connected in series. A first terminal of the second switching transistor is connected to a second terminal of the fourth switching transistor. A control terminal of the second switching transistor is connected to the control terminal of the first switching transistor. A first terminal of the fourth switching transistor is connected to a first terminal of the third switching transistor. The row scan signal is inputted to a control terminal of the fourth switching transistor. A common terminal of the second switching transistor and the fourth switching transistor is connected to the input end of the output circuit.

In yet another possible implementation of the first aspect, the signal latch circuit includes a first series branch and a second branch. The first branch includes a fifth switching transistor and a sixth switching transistor that are connected in series. The row address selection signal is inputted to gates of the fifth switching transistor and the sixth switching transistor. A series common node of the fifth switching transistor and the sixth switching transistor is the output end of the signal latch circuit. A positive voltage signal is inputted to a first terminal of the fifth switching transistor. A negative voltage signal is inputted to a first terminal of the sixth switching transistor. The second branch includes a seventh switching transistor and an eighth switching transistor that are connected in series. A series common node of the seventh switching transistor and the eighth switching transistor is connected to the gates of the fifth switching transistor and the sixth switching transistor. Gates of the seventh switching transistor and the eighth switching transistor are connected to the output end of the signal latch circuit. The positive voltage signal is inputted to a first terminal of the seventh switching transistor. The negative voltage signal is inputted to a first terminal of the eighth switching transistor. The signal latch circuit can enable the row address selection signal inputted from the input end to remain a stable state, to enable the entire driving signal output circuit to remain a stable state.

In another possible implementation of the first aspect, the selection circuit includes a first inverter circuit, a third branch, and a fourth branch. The row address selection signal is inputted to an input end of the first inverter circuit. An output end of the inverter circuit is connected to a control end of the third branch. The third branch includes a ninth switching transistor and a tenth switching transistor that are connected in series. Control terminals of the ninth switching transistor and the tenth switching transistor are the control end of the third branch. A positive voltage signal is inputted to a first terminal of the ninth switching transistor. A negative voltage signal is inputted to a first terminal of the tenth switching transistor. The fourth branch includes an eleventh switching transistor, a twelfth switching transistor, a thirteenth switching transistor, and a fourteenth switching transistor that are sequentially connected in series. A negative voltage signal is inputted to a first terminal of the eleventh switching transistor. A positive voltage signal is inputted to a first terminal of the fourteenth switching transistor. The row scan signal is inputted to control terminals of the eleventh switching transistor and the fourteenth switching transistor. A control terminal of the twelfth switching transistor is connected to a series common terminal of the ninth switching transistor and the tenth switching transistor. A control terminal of the thirteenth switching transistor is connected to the output end of the first inverter circuit. In this solution, a function of the driving signal output circuit is implemented based on an AND-OR-Invert gate, and a circuit structure is simple.

In still another possible implementation of the first aspect, the selection circuit includes a second inverter circuit, a fifth branch, and a sixth branch. The row address selection signal is inputted to an input end of the second inverter circuit. An output end of the second inverter circuit is connected to a control end of the fifth branch. The fifth branch includes a fifteenth switching transistor. A negative voltage signal is inputted to a first terminal of the fifteenth switching transistor. The sixth branch includes a sixteenth switching transistor, a seventeenth switching transistor, and an eighteenth switching transistor that are sequentially connected in series. A common terminal of the sixteenth switching transistor and the seventeenth switching transistor is the output end of the selection circuit and is connected to a second terminal of the fifteenth switching transistor. The row scan signal is inputted to control terminals of the sixteenth switching transistor and the eighteenth switching transistor. A control terminal of the seventeenth switching transistor is connected to the output end of the second inverter circuit. In this solution, a function of the driving signal output circuit is implemented based on a NOR gate circuit.

In yet another possible implementation of the first aspect, the selection circuit includes a seventh branch and an eighth branch. The seventh branch includes a nineteenth switching transistor. The row address selection signal is inputted to a control terminal of the nineteenth switching transistor. A positive voltage signal is inputted to a first terminal of the nineteenth switching transistor. The eighth branch includes a twentieth switching transistor, a twenty-first switching transistor, and a twenty-second switching transistor that are sequentially connected in series. The row scan signal is inputted to control terminals of the twentieth switching transistor and the twenty-second switching transistor. The row address selection signal is inputted to a gate of the twenty-first switching transistor. A negative voltage signal is inputted to a first terminal of the twentieth switching transistor. A positive voltage signal is inputted to a first terminal of the twenty-second switching transistor. In this solution, a function of the driving signal output circuit is implemented based on a NAND gate circuit.

In another possible implementation of the first aspect, the output circuit includes at least one stage of output unit including a CMOS inverter. A quantity of stages of the output units is an odd number.

In still another possible implementation of the first aspect, the output circuit includes at least two stages of output units each including a CMOS inverter. A quantity of stages of the output units is an even number.

In yet another possible implementation of the first aspect, the output unit includes a twenty-third switching transistor and a twenty-fourth switching transistor that are connected in series. Control terminals of the twenty-third switching transistor and the twenty-fourth switching transistor are connected to the output end of the selection circuit. A series common node of the twenty-third switching transistor and the twenty-fourth switching transistor is an output end of the output circuit. A positive voltage signal is inputted to a first terminal of the twenty-third switching transistor. A negative voltage signal is inputted to a first terminal of the twenty-fourth switching transistor.

In another possible implementation of the first aspect, the row address selection signal is active when the row address selection signal is a high-level signal, and is inactive when the row address selection signal is a low-level signal.

According to a second aspect, this application further provides a screen driving circuit, used in an OLED screen. The screen driving circuit includes an array driving circuit and the driving signal output circuit according to any one of the first aspect or the possible implementations of the first aspect. The array driving circuit includes a row scan driving circuit and a column driving circuit. The row scan driving circuit generates a row scan signal. The column driving circuit generates a data signal. An input end of the driving signal output circuit is coupled to an output end of the row scan driving circuit, and an output end of the driving signal output circuit is coupled to a horizontal scan line of a pixel driving circuit in the OLED screen, to enable the pixel driving circuit to control display states of pixels of the OLED screen based on a signal on the horizontal scan line and the data signal.

According to a third aspect, this application further provides a display screen, including a pixel array, a pixel driving circuit, and the driving signal output circuit according to any one of the first aspect or the possible implementations of the first aspect. A horizontal scan line of the pixel driving circuit is coupled to the driving signal output circuit. A data line of the pixel driving circuit is coupled to the column driving circuit. The pixel driving circuit is configured to control display states of a part of pixels in the pixel array based on a row scan signal and a data signal.

According to a fourth aspect, this application further provides an electronic device. The electronic device includes: one or more processors, a memory, and the display screen according to the third aspect.

It should be understood that descriptions of technical features, technical solutions, beneficial effects, or similar languages in this application do not imply that all features and advantages can be achieved in any single embodiment. On the contrary, it may be understood that descriptions of features or beneficial effects mean that a particular technical feature, technical solution, or beneficial effect is included in at least one embodiment. Therefore, descriptions of the technical features, technical solutions, or beneficial effects in this specification do not necessarily refer to a same embodiment. Further, the technical features, technical solutions, and beneficial effects described in embodiments may be combined in any appropriate manner. A person skilled in the art may understand that embodiments can be implemented without one or more particular technical features, technical solutions, or beneficial effects of a particular embodiment. In other embodiments, additional technical features and beneficial effects may be further identified in a particular embodiment that does not embody all embodiments.

BRIEF DESCRIPTION OF THE DRAWINGS

To describe the technical solutions in embodiments of the present invention or in conventional technologies more clearly, the following briefly describes the accompanying drawings required for describing embodiments or conventional technologies. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

In the specification, claims, and accompanying drawings of this application, the terms "first", "second", "third", and the like are intended to distinguish between different objects but do not indicate a particular order.

In embodiments of this application, the term such as "exemplary" or "for example" is used to represent giving an example, an illustration, or a description. Any embodiment or design scheme described as an "exemplary" or "for example" in embodiments of this application should not be explained as being more preferred or having more advantages than another embodiment or design scheme. To be precise, use of the term, such as "exemplary" or "for example", is intended to present a related concept in a specific manner.

For clarity and brevity of the following embodiments, the related art is briefly described first.

AMOLED: Active-matrix organic light-emitting diode, which is a form of an OLED. AM indicates that a driving method for each OLED pixel is active driving. The AMOLED drives an organic light-emitting diode through a driving circuit, featuring photoelectric properties such as low power consumption, high resolution, and a high response speed.

GOA: Gate Driver on Array, an integration of a gate driver to an array substrate. In the GOA driving technology, a row scan driving circuit is integrated onto a TFT array substrate by using a current array (Array) process for a thin film transistor liquid crystal panel, to implement a method of driving by scanning gates. TFTs include N-type TFTs and P-type TFTs.

PMOS: Positive channel Metal Oxide Semiconductor, P-channel metal oxide semiconductor.

NMOS: N-Metal-Oxide-Semiconductor, N-channel metal oxide semiconductor.

LTPS: Low Temperature Poly-silicon, low temperature poly-silicon.

IGZO: Indium gallium zinc oxide, indium gallium zinc oxide.

Refresh rate: Indicates a frequency at which an electronic device displays frames, in a unit of Hz. In short, a screen refresh rate is a quantity of times that a screen can be refreshed per second. A higher screen refresh rate indicates a smoother dynamic picture display, but a high refresh rate also leads to an increase in system power consumption and causes issues such as heating of an electronic device.

Figure 1:
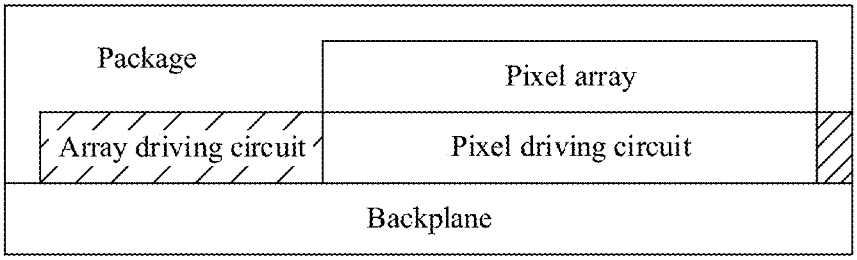
FIG. 1 is a schematic diagram of a structure of an OLED screen.

FIG. 1 is a schematic diagram of a structure of an AMOLED.

As shown in FIG. 1, an AMOLED screen mainly includes a pixel array in the middle, a pixel driving circuit located below the pixel array, an array driving circuit at a same layer as the pixel driving circuit (or referred to as a peripheral driving circuit), and a support backplane below the array driving circuit and a packaging layer at the top.

The pixel array is an effective display region of the AMOLED display screen, and is configured to display content. For example, a typical distribution of the pixel array is an array of 1920*1080 pixels.

Figure 2A:
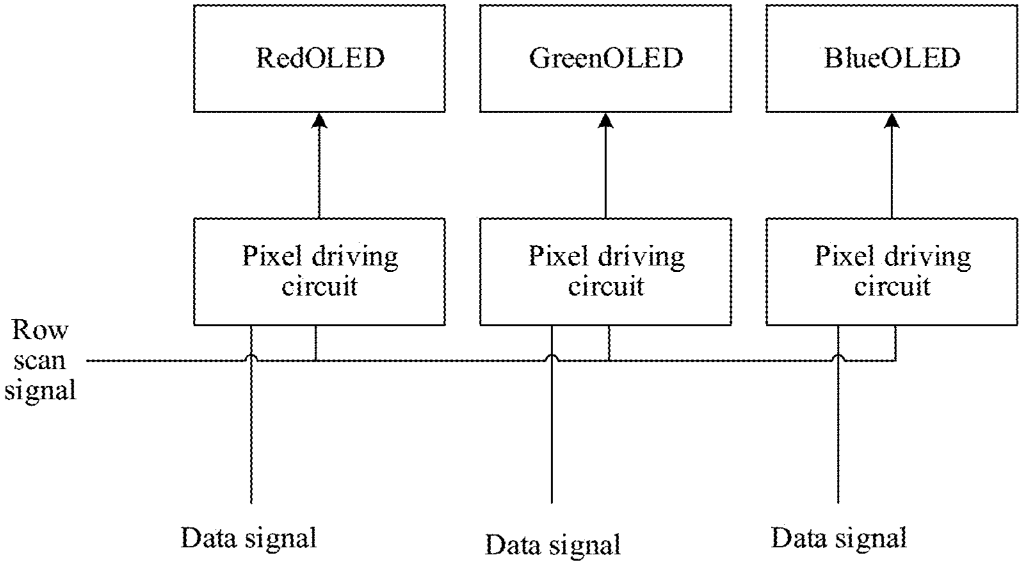
FIG. 2A is a schematic diagram of a single pixel and a pixel driving circuit of an OLED screen.

In an example embodiment, as shown in FIG. 2A, each pixel includes three organic light-emitting diodes in red, green, and blue, that is, a RedOLED, a GreenOLED, and a BlueOLED. Each OLED is coupled to a pixel driving circuit. A row scan signal and a data signal are inputted to each pixel driving circuit.

Figure 2B:
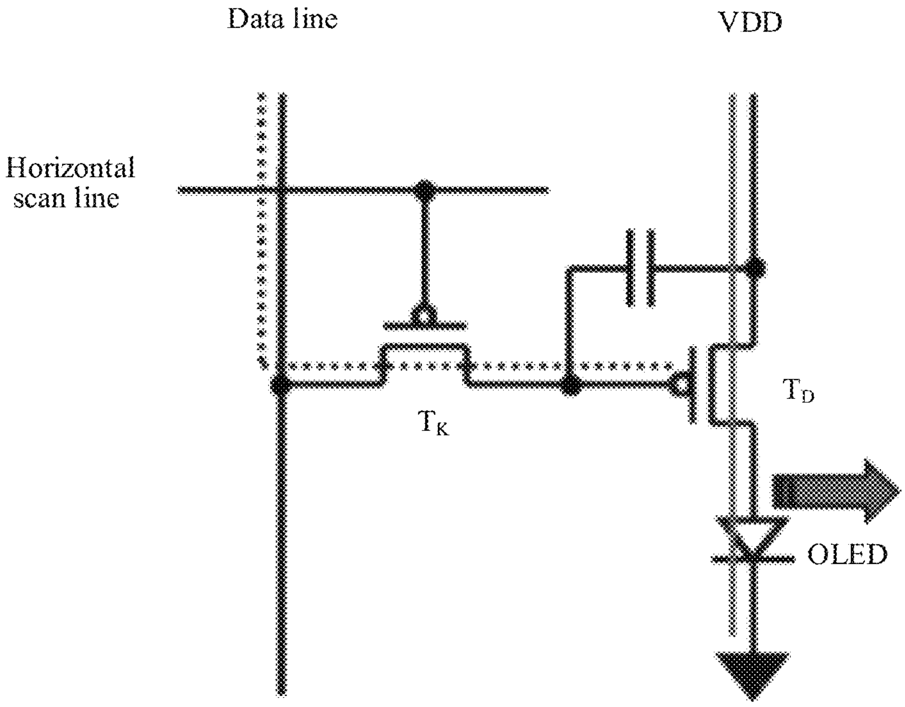
FIG. 2B is an equivalent circuit diagram of a pixel driving circuit.

In an example embodiment, FIG. 2B is an equivalent circuit diagram of a single pixel and a pixel driving circuit.

As shown in FIG. 2B, a positive electrode of the OLED (the RedOLED, the GreenOLED, or the BlueOLED) is coupled to a positive voltage VDD through a driving transistor $T_D$, and a negative electrode of the OLED is grounded GND or connected to a negative voltage VSS.

The pixel driving circuit includes a plurality of switching transistors and a plurality of driving transistors. For the convenience of description, as shown in FIG. 2B, the plurality of switching transistors are equivalent to one switching transistor (that is, $T_K$). Similarly, the plurality of driving transistors are equivalent to one driving transistor (that is, $T_D$).

As shown in FIG. 2B, a control terminal of the equivalent driving transistor $T_D$ is coupled to a data line through the equivalent switching transistor $T_K$, and a control terminal of the equivalent switching transistor $T_K$ is coupled to a horizontal scan line. The data line is configured to receive a data signal, and the horizontal scan line is configured to receive a row scan signal. The pixel driving circuit is configured to drive the OLED to emit light and adjust brightness based on the row scan signal and the data signal.

Figure 3:
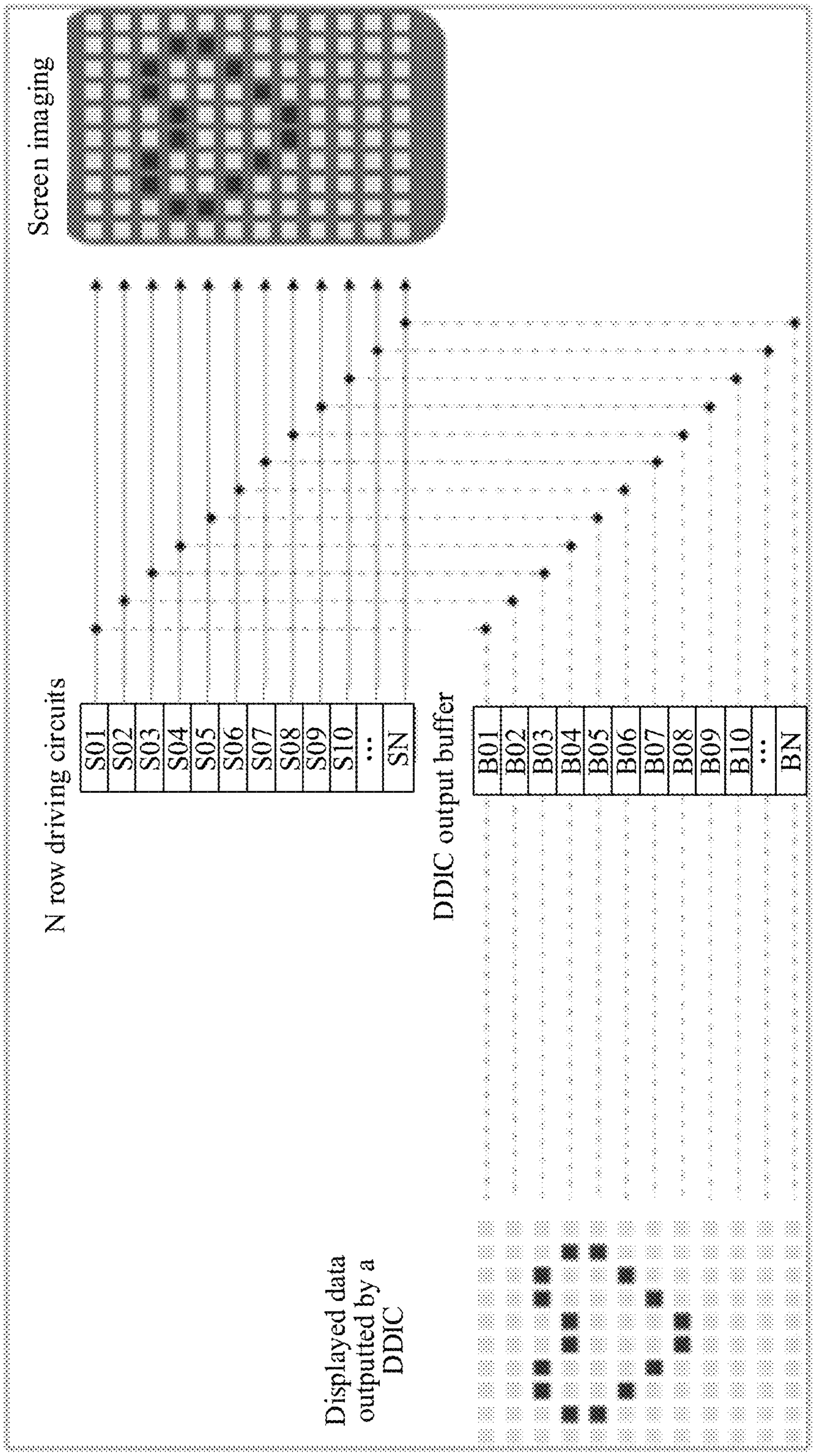
FIG. 3 is a schematic diagram of a conventional process of refreshing displayed content by using a progressive scanning method.

In an example embodiment, as shown in FIG. 3, the array driving circuit includes a row scan driving circuit and a column driving circuit. The row scan driving circuit provides the pixel driving circuit with a row scan signal. The column driving circuit provide the pixel driving circuit with a data signal.

Figure 2C:
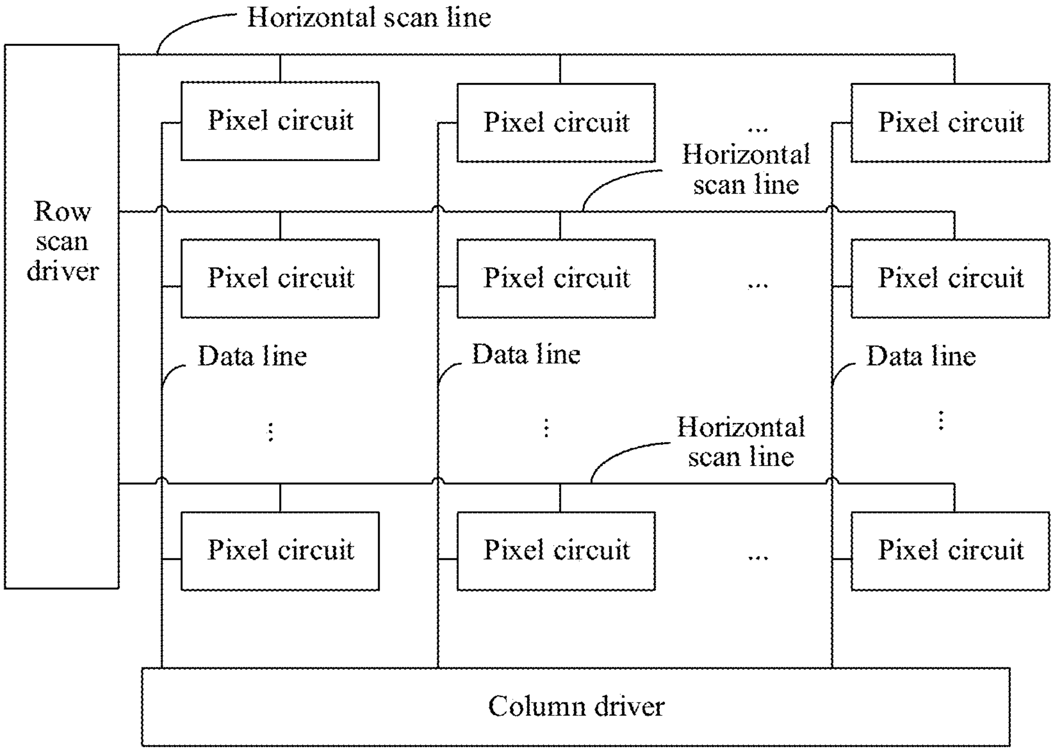
FIG. 2C is a schematic diagram of a pixel driving array and an array driving circuit of an OLED screen.

As shown in FIG. 2C, an input end of a row scan driver is connected to an output end of an integrated circuit having a memory, and each output end of the row scan driver is connected to a horizontal scan line.

In an example embodiment, the integrated circuit having a memory may be a display driver integrated circuit (display driver integrated circuit, DDIC), a field programmable gate array (field programmable gate array, FPGA), or a high frequency clock integrated circuit. A type of the integrated circuit having a memory is not limited in this application.

In this embodiment, an example in which the integrated circuit having a memory is a DDIC is used for description.

The row scan driver is configured to convert a serial bus clock signal of the DDIC into a sequential write pulse with a driving capability, that is, a row scan signal. The row scan driver performs scanning from the first line (firstLine) to the end line (endLine) or from the end line to the first line. For example, a GOA driving circuit may be used in the row scan driver, and certainly, another driving circuit may be used. A type of the row scan driver is not limited in this application.

An input end of a column driver is connected to the integrated circuit having a memory, and each output end of the column driver is connected to a data line. The column driver is configured to write a data signal (Data signal) outputted by a DDIC chip to a pixel circuit directly or through a time shifter (multiplexer, MUX). The data signal is linearly written to the pixel circuit under driving by the row scan signal, to implement content refreshing on the entire screen.

The pixel driving circuit and the array driving circuit may also be referred to as an active matrix (ActiveMatrix). In the AMOLED screen, the integrated circuit having a memory and the ActiveMatrix drive the RedOLED, the GreenOLED, and the BlueOLED to perform color mixing, to convert image displayed content into an optical signal of the display screen.

For example, in an example embodiment, each row scan driving circuit may include at least one driving unit, and each driving unit is configured to separately drive the RedOLED, the GreenOLED, or the BlueOLED.

It can be learned that, currently, a mainstream method for driving an AMOLED screen is: linearly writing a data signal under driving of a row scan signal, to refresh content on the entire screen. For example, as shown in FIG. 3, it is assumed that the screen includes 12×10 pixels, that is, 12 rows and 10 columns of pixels. Content that needs to be displayed is a heart-shaped pattern (16 pixels in total) in the middle. Based on a current driving method of progressive scanning, a refresh area is 100%, that is, pixels on the entire screen are refreshed, causing problems of high power consumption and a long delay.

Figure 4:
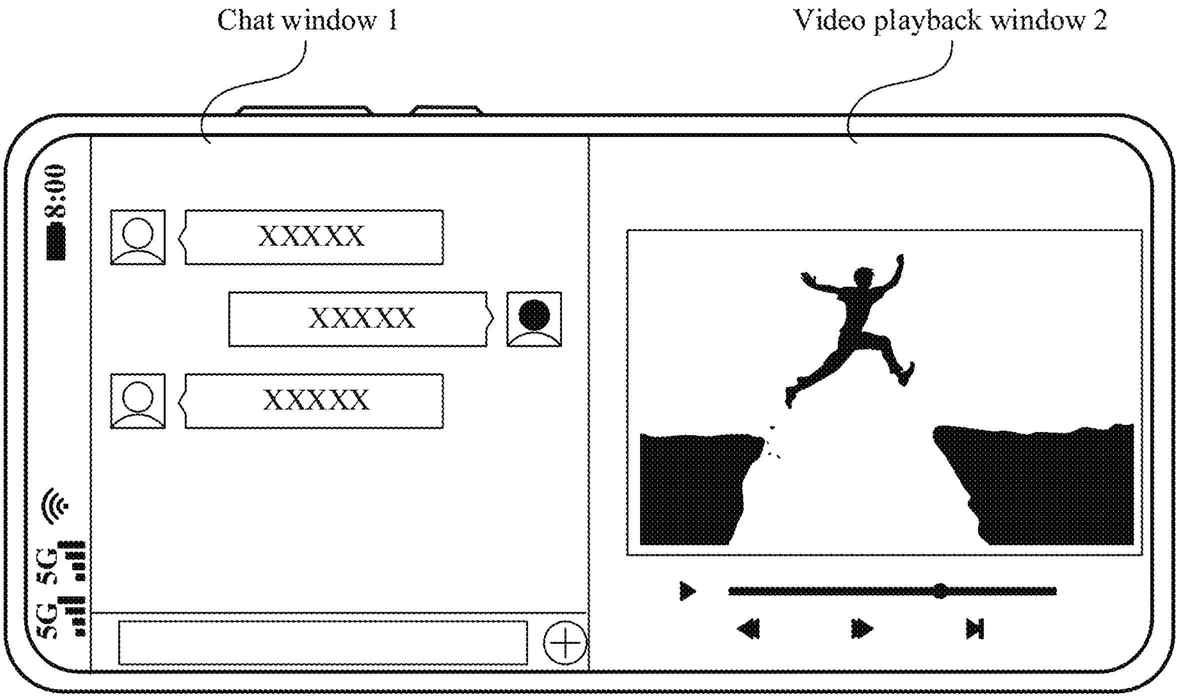
FIG. 4 is a schematic diagram of an application scenario with a plurality of display windows according to an embodiment of this application.

For another example, an example in which an electronic device is a mobile phone, a tablet, or the like is used. In a typical application scenario, a screen is divided into two display windows. As shown in FIG. 4, one is a chat window 1, and the other is a video playback window 2. For the chat window 1, a content change rate of this window is low, and this region needs a low refresh rate theoretically, for example, 30 Hz. For the video playback window 2, a content change rate of this window is high, and this region needs a high refresh rate, for example, 120 Hz or 60 Hz. Therefore, in this application scenario, a refresh rate of the entire screen needs to be set to meet a requirement of a window with a highest requirement, that is, a refresh rate requirement of the video playback window 2, that is, 120 Hz or 60 Hz. Consequently, a display window that does not require a high refresh rate also has to use a high refresh rate. As a result, power consumption is high and a delay is long.

According to the foregoing progressive scanning method of the AMOLED screen, in a scenario in which only content in a part of regions needs to be refreshed on the AMOLED screen and content in a part of regions does not need to be refreshed, the entire screen still needs to be refreshed. In this case, write power consumption is high. In addition, a delay in this linear write manner is long, and a feedback delay of an I/O device such as an active stylus may not be met. In addition, the foregoing row driving method cannot be applied to a split-screen driving scenario. For example, a large screen of a foldable mobile phone may be divided into at least two screen regions to display different content respectively.

To resolve a problem in the row scan driving method of the AMOLED screen, this application provides a driving signal output circuit. The driving signal output circuit includes an N-type output circuit. An input end of the N-type output circuit is coupled to a row scan driver. A row address selection signal is inputted to a control end of the N-type output circuit. An output end of the N-type output circuit is coupled to a horizontal scan line. When the row address selection signal is active, the N-type output circuit outputs a row scan signal, to be specific, drives a corresponding pixel row to update corresponding content data. When a row address selection signal outputted by a DDIC is inactive, the N-type output circuit outputs an inactive signal. To be specific, displayed content in a region whose content is to be updated can be refreshed by using the N-type output circuit, without refreshing displayed content in a picture holding region. In can be learned that in this solution, refresh of displayed content is carried out at different refresh frequencies based on refresh requirements of different display regions on the display screen, but not at a same refresh frequency on the entire AMOLED screen, so that power consumption of the AMOLED screen is reduced. In addition, corresponding pixel rows are driven based on requirements, without needing to perform progressive scanning in sequence, so that a display delay is reduced, thereby effectively reducing a feedback delay of an IO device such as an active stylus. In addition, this solution may be further applied to a split-screen driving scenario, to extend an application range of the AMOLED screen.

The following describes in detail, with reference to accompanying drawings, a screen driving circuit and a working process of the screen driving circuit according to embodiments of this application.

In this specification, an example in which the row scan driver is a GOA circuit is used for description. As described above, the array driving circuit may alternatively be another type of driving circuit, such as an EM driving circuit. A type of the array driving circuit is not limited in this specification.

Figure 5:
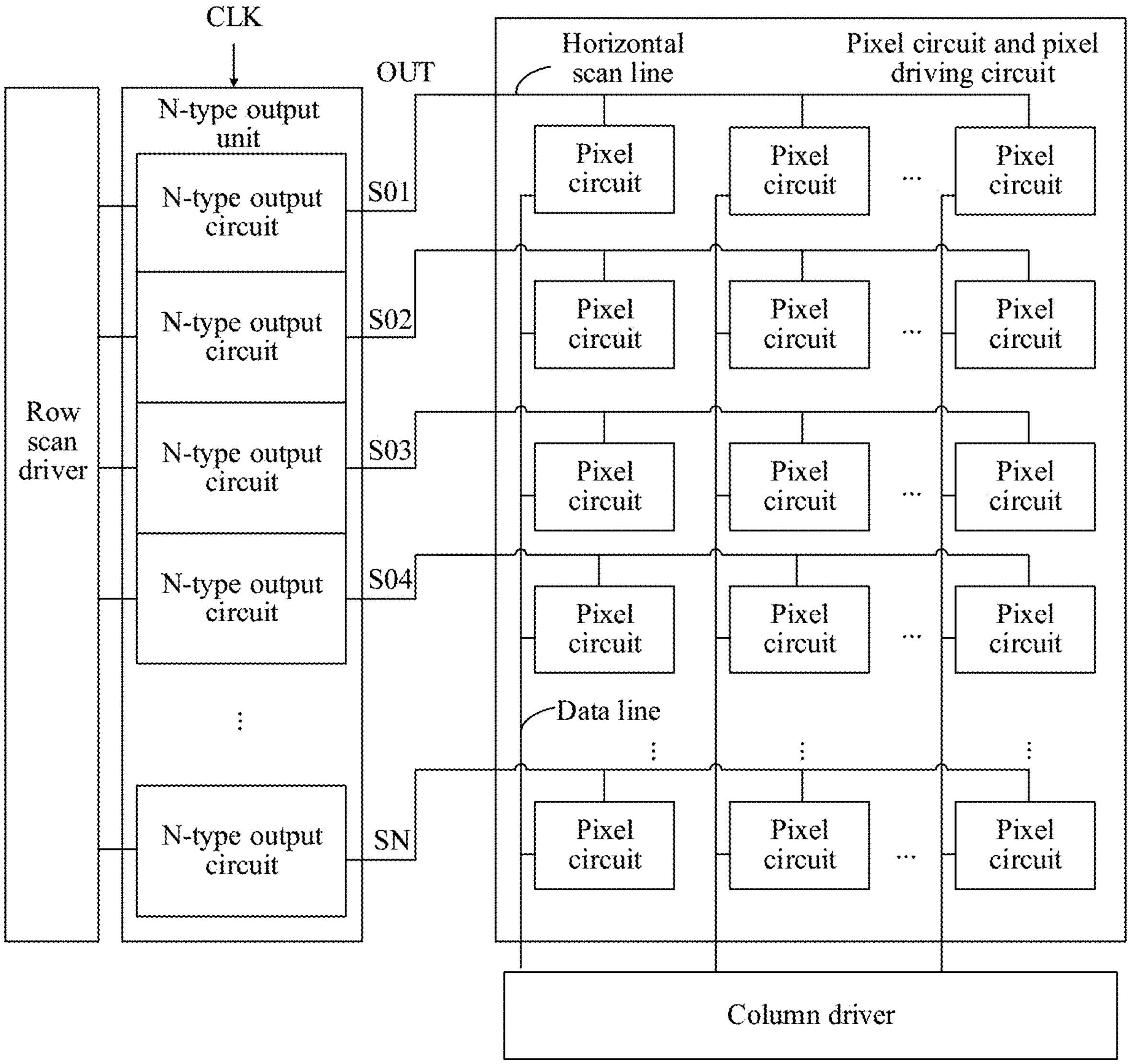
FIG. 5 is a schematic diagram of a structure of a pixel array and an array driving circuit of an OLED screen according to an embodiment of this application.

FIG. 5 is a schematic diagram of a driving circuit of an OLED screen according to an embodiment of this application.

As shown in FIG. 5, the OLED screen driving circuit includes a row scan driver, an N-type output unit, and a column driver.

In an example embodiment, the N-type output unit includes a plurality of N-type output circuits (that is, driving signal output circuits). For example, the N-type output circuits are in one-to-one correspondence with pixel rows. In other words, each pixel row is connected to one N-type output circuit. Alternatively, one N-type output circuit correspond to a plurality of pixel rows. In other words, one N-type output circuit is connected to a plurality of pixel rows.

In an example embodiment, each output end of the row scan driver is connected to one N-type output circuit. Each output end of the row scan driver is connected to an input end of one driving selector. An output end of each N-type output circuit is connected to a horizontal scan line of one row of pixel circuits.

Each output end of the row scan driver outputs a row scan signal of a correspond row of pixel circuits. The row scan signal may enable switching transistors of the row of pixel circuits connected to the row scan driver to be turned on.

In an example embodiment, the row scan driver includes a plurality of row scan driving circuits, and an output end of each row scan driving circuit is an output end of the row scan driver. In other words, each output end of the row scan driver is connected to one row driving circuit. For example, the row scan driving circuit may be a GOA circuit.

The N-type output circuit is configured to selectively output a row scan signal based on a control signal CLK. When the CLK signal is active, a row scan signal outputted by the row scan driving circuit is outputted. When the CLK signal is inactive, the row scan signal outputted by the row scan driver is shielded. In other words, the N-type output circuit is configured to: when the CLK signal received by the N-type output circuit is active, enable a row scan signal outputted by the row scan driving circuit connected to the N-type output circuit to be transmitted to a corresponding row scan line; and when the CLK signal received by the N-type output circuit is inactive, shield the row scan signal outputted by the row scan driving circuit.

Figure 6:
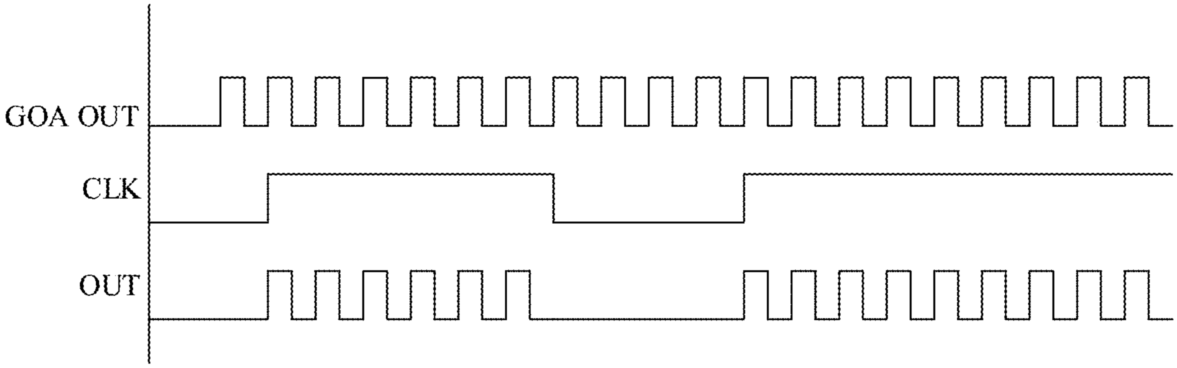
FIG. 6 is a schematic diagram of a signal waveform of respective ends of an N-type output circuit shown in FIG. 5.

FIG. 6 is a diagram of each signal waveform of an N-type output circuit according to an embodiment of this application.

As shown in FIG. 6, GOA OUT is a row scan signal outputted by a row scan driver, CLK is a control signal outputted by a DDIC chip, and OUT is a signal outputted by the N-type output circuit.

The GOA OUT is a write pulse signal having a driving capability (that is, a row scan signal). When the CLK signal is active (for example, the CLK signal is active low), an output end OUT of the N-type output circuit outputs the write pulse signal outputted by a GOAOUT end coupled to the N-type output circuit. When the CLK signal is inactive, the OUT outputs a constant low-level signal.

When content in a part of display regions on a display screen needs to be updated, for example, as shown in FIG. 5, the display regions that need to be updated include four pixel rows of S01 to S04, each of CLK signals of N-type output circuits connected to the four pixel rows of S01 to S04 may be enabled to be active, and each of CLK signals of N-type output circuits connected to other pixel rows may be enabled to be inactive. In other words, row scan signals corresponding to the four pixel rows of S01 to S04 may be transmitted to a horizontal scan line, and row scan signals of other pixel rows are all inactive signals.

Figure 7:
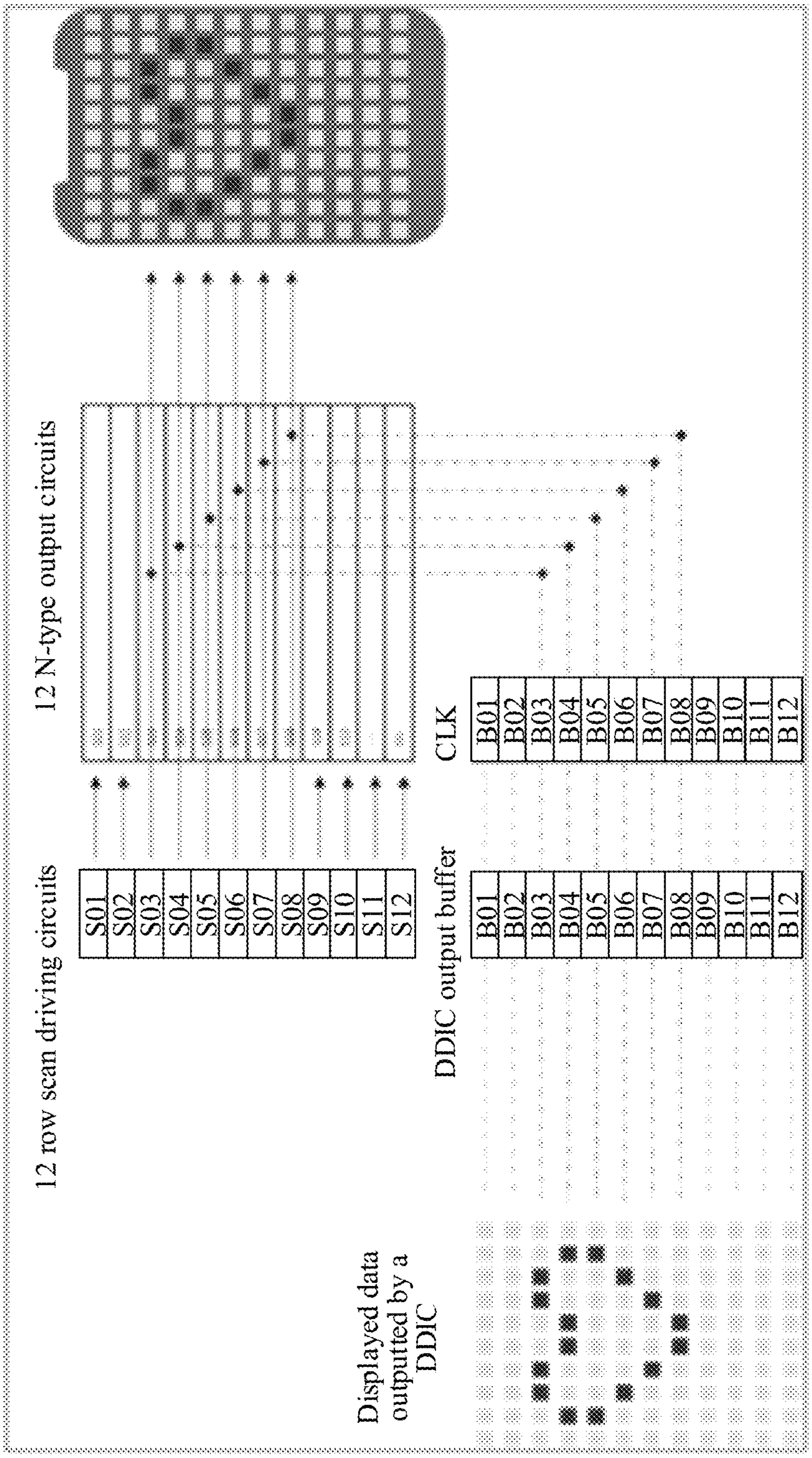
FIG. 7 is a schematic diagram of a process of refreshing screen content by using the array driving circuit shown in FIG. 5.

The example shown in FIG. 3 is still used. A heart-shaped pattern is displayed on the display screen. After the screen driving circuit shown in FIG. 5 is used, a display process of the heart-shaped pattern is shown in FIG. 7. An output end of each row scan driving circuit is connected to one N-type output circuit. A DDIC output buffer outputs a serial clock signal. In addition, a DDIC generates a row address selection signal CLK based on a pixel row whose content is to be updated. Logical processing is performed on the CLK and row driving signals outputted by the N-type output circuits, and finally a corresponding row driving signal is output for only a row whose content is to be updated.

An example of an array of 12×10 pixels shown in FIG. 7 is used for description. For a row in which the CLK is active, the N-type output circuit is turned on, that is, outputs a corresponding row scan signal. For a row in which the CLK is inactive, the N-type output circuit shields a corresponding row scan signal and outputs an inactive signal. For example, an image that needs to be displayed is a heart-shaped pattern, that is, content in the third to the eighth rows needs to be updated, and other rows do not need to be updated. The N-type output circuits output only row driving signals corresponding to the third to the eighth rows. In can be learned that only display states of some pixels need to be refreshed without needing to refresh display states of pixels of the entire screen.

A working process of the N-type output circuit according to embodiments of this application is described below with reference to FIG. 8 to FIG. 19.

Figure 8:
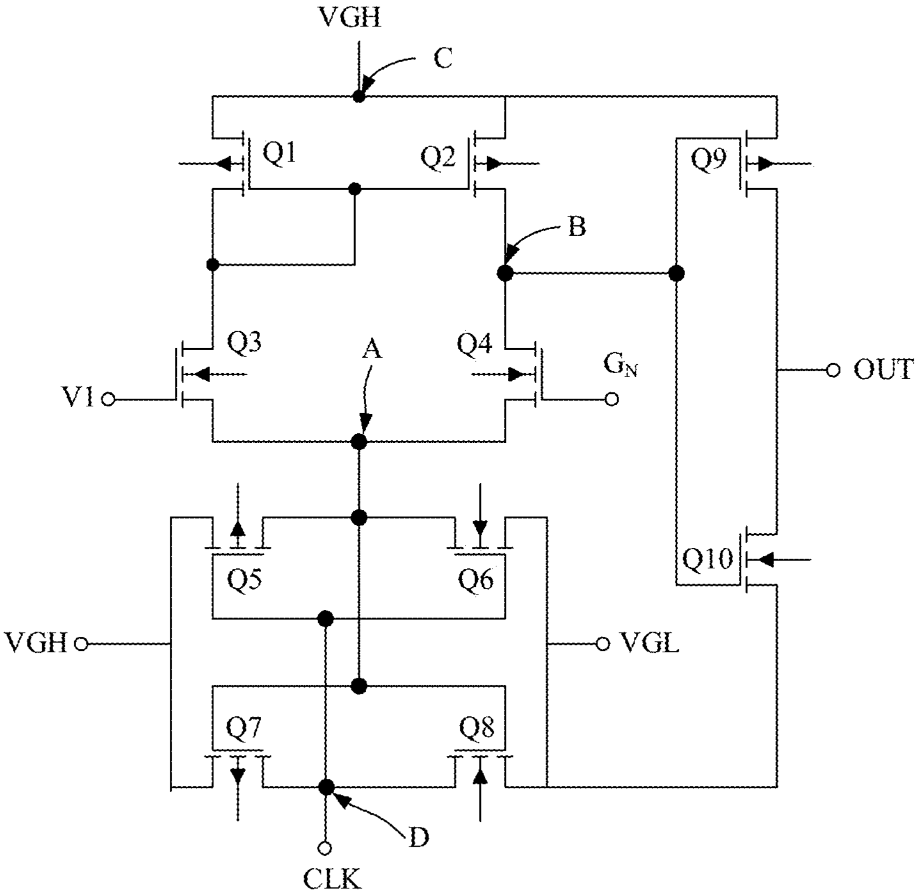
FIG. 8 is a schematic diagram of an N-type output circuit according to an embodiment of this application.

FIG. 8 is a schematic diagram of an N-type output circuit according to an embodiment of this application.

As shown in FIG. 8, the N-type output circuit according to this embodiment includes a first input end, a control end, and an output end.

The first input end is connected to an output end of a row scan driving circuit. That is, a row scan signal $G_N$ is inputted to the first input end. In an example embodiment, the row scan driving circuit may be a GOA circuit or a clock generator. The row scan driving circuit is not limited in this application.

The control end is connected to a row address selection signal output end of a DDIC, and the row address selection signal CLK is inputted to the control end. The output end OUT is connected to a horizontal scan line to drive a pixel row connected to the N-type output circuit.

As shown in FIG. 8, the N-type output circuit includes switching transistor Q1 to Q10. Q1 to Q4 are connected to form a load circuit. Q5 to Q8 are connected to form a signal latch circuit. Q9 and Q10 are connected to form an output circuit. The load circuit and the signal latch circuit may be referred to as a selection circuit.

Q1 and Q3 are connected in series to form a first series branch, Q2 and Q4 are connected in series to form a second series branch, and the first series branch is connected in parallel to the second series branch.

A source of Q1 is connected to a drain of Q3. A positive voltage signal VGH (for example, +8 V) is inputted to a drain of Q1. A gate of Q1 is connected to the source of Q1. A first voltage signal V1 is inputted to a gate of Q3. V1 is a low-level signal, for example, a 0 V voltage signal.

A gate of Q2 is connected to the gate of Q1. The positive voltage signal VGH is inputted to a drain of Q2. A source of Q2 is connected to a drain of Q4. A source of Q4 is connected to a source of Q3. A gate of Q4 is the first input end of the N-type output circuit and the row scan signal $G_N$ is inputted. In addition, a common connection point of Q3 and Q4 is denoted as a node A, a common connection point of Q2 and Q4 is denoted as a node B, and a common connection point of Q1 and Q2 is denoted as a node C.

Q5 and Q6 are connected in series to form a third series branch, Q7 and Q8 are connected in series to form a fourth series branch, and the third series branch is connected in parallel to the fourth series branch.

A positive voltage signal VGH is inputted to a source of Q5. A drain of Q5 is connected to a drain of Q6. A negative voltage signal VGL (for example, −8 V) is inputted to a source of Q6. A row address selection signal CLK is inputted to gates of Q5 and Q6.

The positive voltage signal VGH is inputted to a source of Q7. A drain of Q7 is connected to a drain of Q8. The negative voltage signal VGL is inputted to a source of Q8. Gates of Q7 and Q8 are connected to a drain common connection point of Q5 and Q6. In addition, a drain common connection point of Q7 and Q8 is denoted as a node D.

Q9 is connected in series to Q10. The positive voltage signal VGH is inputted to a source of Q9. A drain of Q9 is connected to a drain of Q10. The negative voltage signal VGL is inputted to a source of Q10. Gates of Q9 and Q10 are connected to the common connection point of Q2 and Q4, that is, the node B. A drain common connection point of Q9 and Q10 is the output end OUT of the N-type output circuit.

The N-type output circuit shown in FIG. 8 is an example embodiment of this application. Input/output ends of the N-type output circuit may be connected to an inverter of any stage. The inverter may be a CMOS inverter, for example, a CMOS inverter formed by connecting Q9 and Q10 in series as shown in FIG. 8. For example, when the CLK signal is active high, the CLK signal may be directly inputted to the control end. If the CLK signal is active low, the CLK signal may be inverted by the inverter and then inputted to the control end.

In addition, any switching transistor in the circuit shown in FIG. 8 may be replaced by connecting a plurality of switching transistors of a same type in series or in parallel with a common gate, to improve a current capability.

Similarly, the output circuit may be obtained by connecting in parallel or in series a plurality of output units formed by Q9 and Q10. For example, the output circuit may be obtained by connecting in parallel a plurality of units formed by Q9 and Q10, to improve time effectiveness of driving of the output circuit, to be specific, to shorten duration required for reaching a driving capability by a current outputted by the output circuit.

For example, in this embodiment, a quantity of the output units in the output circuit may be odd, for example, one output unit or three output units, to ensure that the OUT end outputs a constant low-level signal when CLK is inactive.

Figure 9:
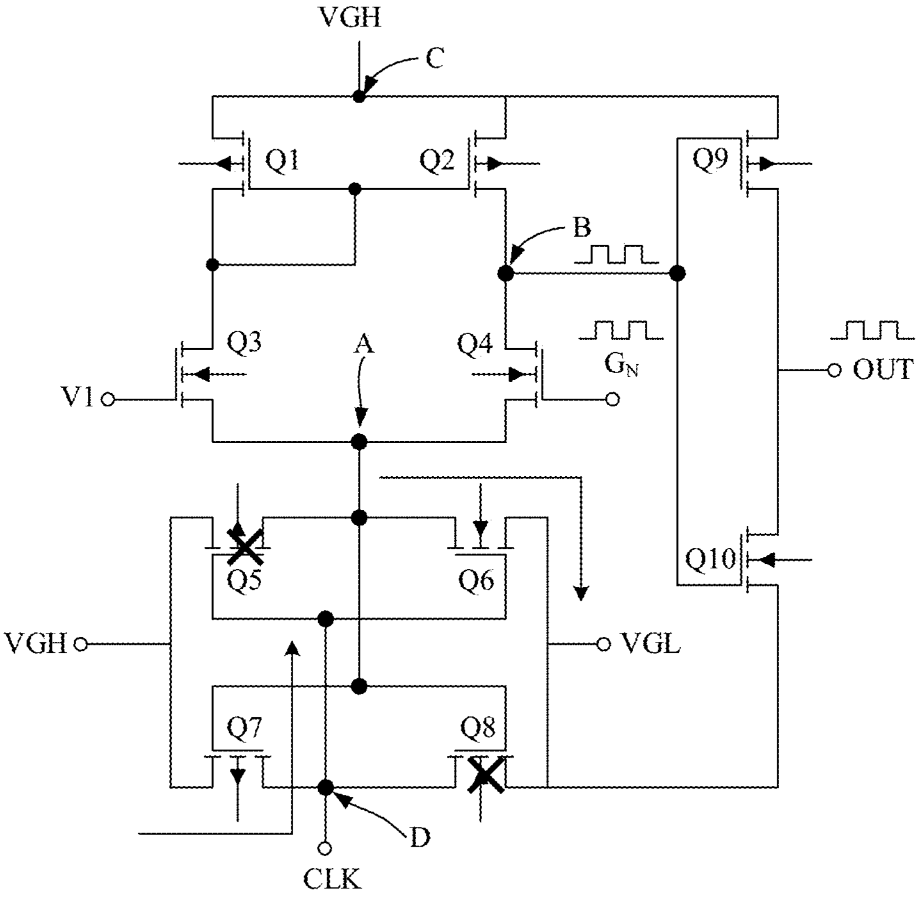
FIG. 9 is an equivalent circuit diagram of the circuit shown in FIG. 8 when a CLK signal is active.

FIG. 9 is an equivalent circuit diagram of the N-type output circuit shown in FIG. 8 when the CLK signal is active.

In an example embodiment, the CLK signal is active high. To be specific, the CLK signal being in a high level indicates that the row address selection signal is active, and the CLK signal being in a low level indicates that the row address selection signal is inactive.

As shown in FIG. 9, Q5 is a PMOS transistor, and Q6 is an NMOS transistor. When the CLK signal is in a high level, Q5 is turned off, Q6 is turned on, and VGL is transmitted to the node A through Q6. In this case, a voltage difference between the node A and the node C is about (VGH-VGL), so that the load circuit formed by Q1 to Q4 operates normally.

As shown in FIG. 9, the gate of Q1 is connected to the source of Q1, that is, Q1 is in a high impedance state. Q1 and Q3 form a voltage division bridge arm, and Q2 and Q4 form another voltage division bridge arm. The gate of Q1 is connected to the source of Q1, and a gate voltage of Q3 is V1, that is, gate voltages of Q1 and Q3 remain stable. In this case, voltage division of Q1 and Q3 is stable.

The voltage division bridge arm formed by Q2 and Q4 is connected in parallel to the voltage division bridge arm formed by Q1 and Q3. In addition, types and sizes of Q2 and Q1 are the same, that is, Q2 is equivalent to Q1, and Q2 has large resistance.

A gate voltage of Q4 is the row scan signal $G_N$, and therefore, resistance of Q4 is variable. A total voltage drop of the voltage division bridge arm formed by Q2 and Q4 is substantially unchanged, so that a current on the voltage division bridge arm formed by Q2 and Q4 is variable, leading to a case that a voltage drop on Q4 changes with the gate voltage of Q4. The node B outputs a pulse signal having a frequency the same as that of $G_N$, that is, a voltage signal outputted by the node B is the same as $G_N$.

The signal at the node B is the pulse signal. For the output circuit, at a high-level stage when the signal at the node B is the pulse signal, Q10 is turned on, and Q9 is turned off. In this case, VGL is transmitted to the output end OUT through Q10. At a low-level stage when the signal at the node B is the pulse signal, Q9 is turned on, and Q10 is turned off. In this case, VGH is transmitted to the output end OUT through Q9. It can be learned that the output end OUT outputs a pulse signal having a frequency the same as that of the pulse signal at the node B, that is, OUT outputs a pulse signal having a frequency the same as that of $G_N$.

In addition, for the signal latch circuit, Q7 is a PMOS, and Q8 is an NMOS. When CLK is in a high level, a signal at the node A is VGL, so that Q7 is turned on, Q8 is turned off, VGH is transmitted to the node D through Q7, and a voltage at the node D is transmitted to the gates of Q5 and Q6. In other words, CLK is held as a positive voltage signal VGH.

In conclusion, when the CLK signal is a high-level signal, OUT outputs a pulse signal having a frequency the same as that of $G_N$. That is, OUT outputs an active row scan signal.

Figure 10:
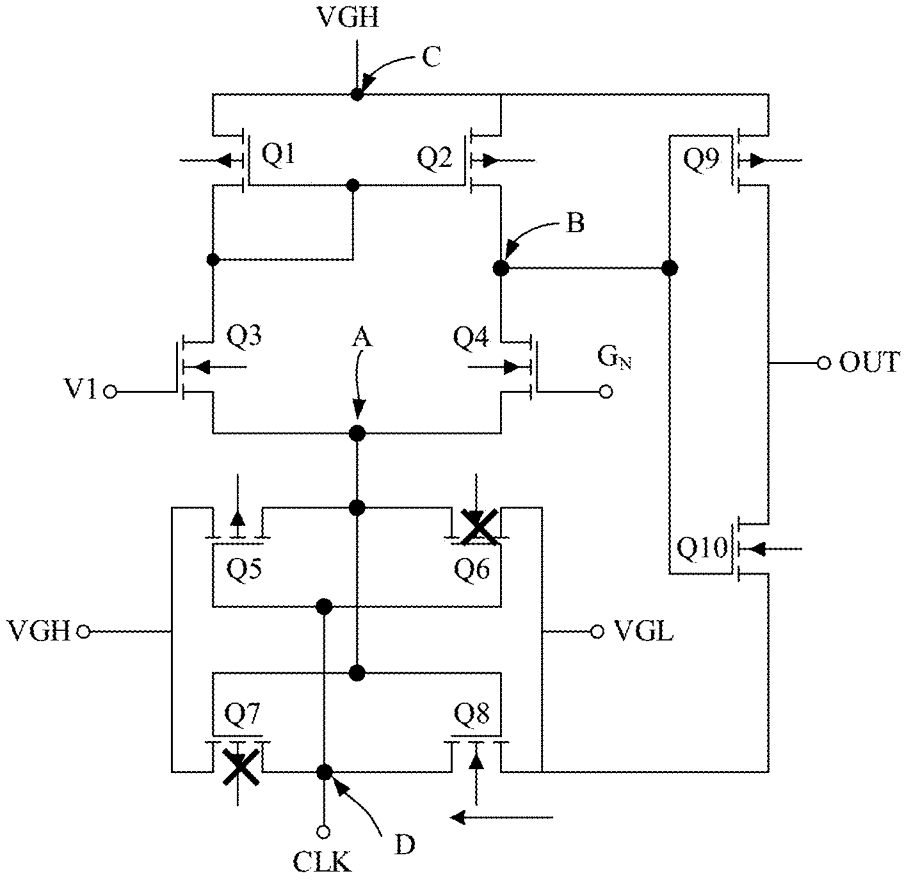
FIG. 10 is an equivalent circuit diagram of the circuit shown in FIG. 8 when a CLK signal is inactive.

FIG. 10 is an equivalent circuit diagram of the N-type output circuit shown in FIG. 8 when the CLK signal is inactive.

An example in which the CLK signal is active in a high level and is inactive in a low level is still used for description. As shown in FIG. 10, when the CLK signal is in the low level, Q5 is turned on, Q6 is turned off, and a voltage at the node A is VGH, that is, a voltage of the voltage division bridge arm formed by Q1 and Q3 is about VGH. Similarly, a voltage of the voltage division bridge arm formed by Q2 and Q4 is about VGH. The voltage of the entire voltage division bridge arm is VGH, and therefore, a voltage at the node B is about VGH. In this case, Q10 is turned on, and Q9 is turned off, so that VGL is transmitted to the OUT end through Q10. In other words, when CLK is in the low level, the OUT end outputs a constant low-level signal.

Types of switching transistors in a pixel driving circuit vary, and row scan signals required are also different, for example, a forward pulse signal or a reverse pulse signal. The N-type output circuit in this embodiment is applied to a pixel driving circuit that needs a forward pulse signal. The forward pulse signal refers to a signal which is active when a row scan signal is a pulse signal with alternating positive and negative voltages and is inactive when the row scan signal is a negative voltage signal.

In addition, for the signal latch circuit, when CLK is a low-level signal, a signal at the node A is VGH, so that Q8 is turned on, Q7 is turned off, and VGL is transmitted to the gates of Q5 and Q6 through Q8. In other words, a signal at the node D is held as a negative voltage signal VGL.

In conclusion, a diagram of a signal waveform of respective ends of the N-type output circuit shown in FIG. 8 is as shown in FIG. 6. To be specific, when CLK is in the high level, the OUT end outputs an active row scan signal (that is, a pulse signal), and when CLK is in the low level, the OUT end outputs a constant low-level signal.

In conclusion, when a pixel row of a part of display regions do not need to be refreshed, OUT of a N-type output circuit connected to the pixel rows of the region may be controlled to output a constant low-level signal. In this case, a signal on the horizontal scan line is a write inactivate signal. In other words, a data signal cannot be written to a row of pixel circuits. That is, a display state of the pixel row is not refreshed.

According to the N-type output circuit in this embodiment, the input end of the N-type output circuit is coupled to a row scan driver. A row address selection signal is inputted to the control end of the N-type output circuit. The output end of the N-type output circuit is coupled to the horizontal scan line. When the row address selection signal is active, the N-type output circuit outputs a row scan signal, to be specific, drives a corresponding pixel row to update corresponding content data. When a row address selection signal outputted by a DDIC is inactive, the N-type output circuit outputs an inactive signal. To be specific, displayed content in a region whose content is to be updated can be refreshed by using the N-type output circuit, without refreshing displayed content in a picture holding region. In can be learned that in this solution, refresh of displayed content is carried out at different refresh frequencies based on refresh requirements of different display regions on the display screen, but not at a same refresh frequency on the entire AMOLED screen, so that power consumption of the AMOLED screen is reduced. In addition, corresponding pixel rows are driven based on requirements without needing to perform progressive scanning in sequence, so that a display delay is reduced.

Figure 11:
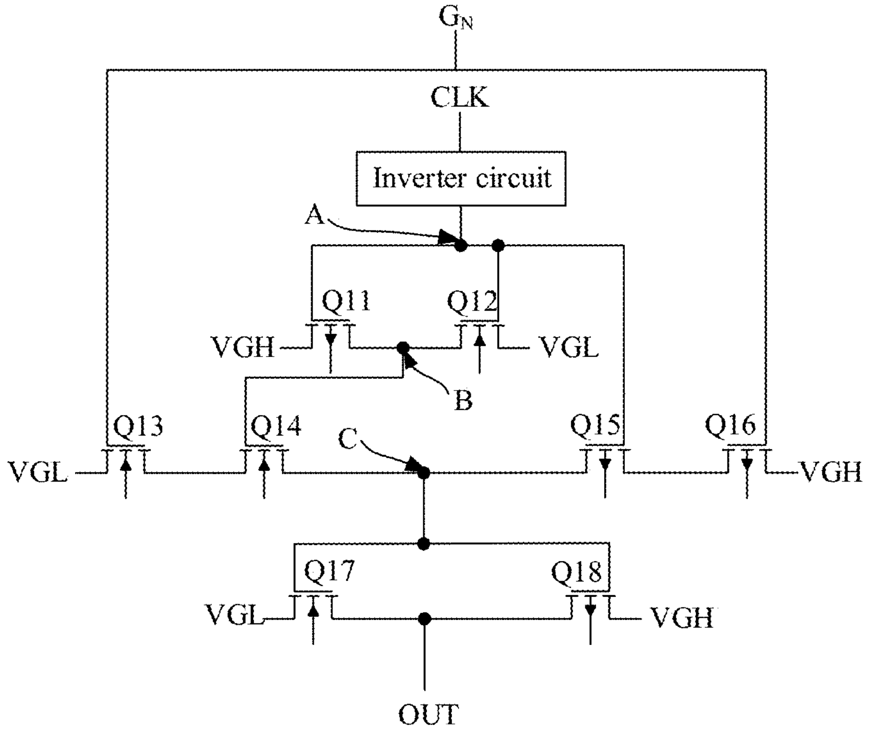
FIG. 11 is a schematic diagram of another N-type output circuit according to an embodiment of this application.

FIG. 11 is a schematic diagram of another N-type output circuit according to an embodiment of this application. The N-type output circuit is implemented by using an AND-OR-Invert gate formed by switching transistors in this embodiment.

As shown in FIG. 11, the N-type output circuit according to this embodiment includes a selection circuit formed by Q11 to Q17 and an output circuit formed by Q17 and Q18.

Q11 is connected in series to Q12 with a common gate. A positive voltage signal VGH is inputted to a source of Q11. A drain of Q11 is connected to a drain of Q12. A negative voltage signal VGL is inputted to a source of Q12. A row address selection signal CLK is inputted to gates of Q11 and Q12 through an inverter circuit.

Q13 to Q16 are sequentially connected in series through sources and drains. VGL is inputted to the source of Q13. The drain of Q13 is connected to the source of Q14. The drain of Q14 is connected to the drain of Q15. The source of Q15 is connected to the drain of Q16. A positive voltage signal VGH is inputted to the source of Q16. A row scan signal $G_N$ is inputted to gates of Q13 and Q16. A gate of Q14 is connected to a drain-source common connection point of Q11 and Q12. A gate of Q15 is connected to an output end of the inverter circuit.

The output end of the inverter circuit is denoted as a node A. The drain-source common terminal of Q11 and Q12 is denoted as a node B. A drain-source common terminal of Q14 and Q15 is denoted as a node C.

Q17 and Q18 form a CMOS inverter. A negative voltage signal VGL is inputted to a source of Q17. A drain of Q17 is connected to a drain of Q18. A positive voltage signal VGH is inputted to a source of Q18. Gates of Q17 and Q18 are connected to the node C. A drain-source common terminal of Q17 and Q18 is an output end OUT of the N-type output circuit.

Figure 12:
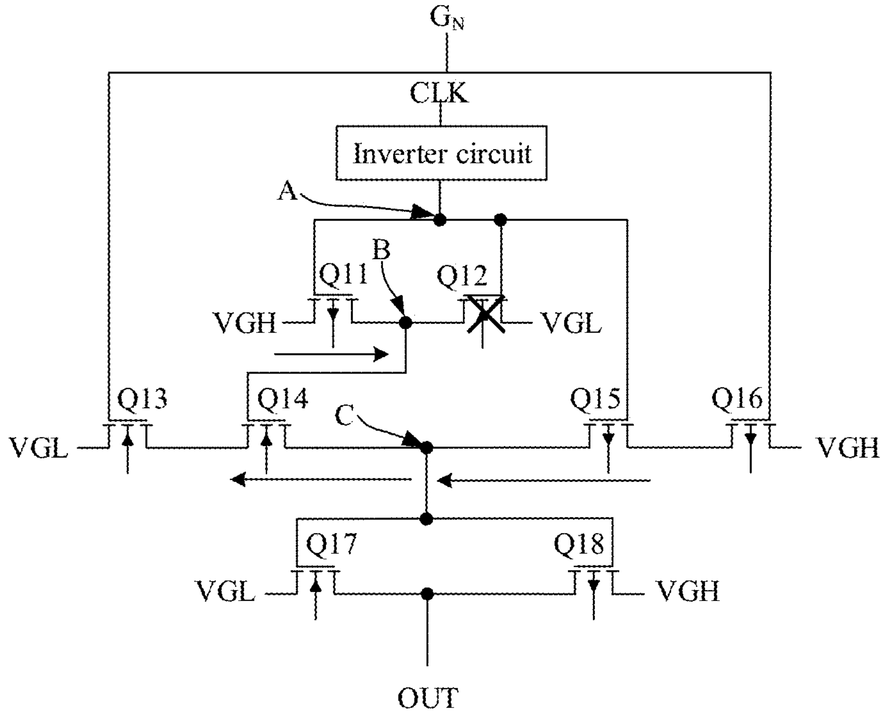
FIG. 12 is an equivalent circuit diagram of the circuit shown in FIG. 11 when a CLK signal is active.

FIG. 12 is an equivalent circuit diagram of the N-type output circuit shown in FIG. 11 when the CLK signal is active.

In this embodiment, an example in which the CLK signal is active in a high level and the CLK signal is inactive in a low level is used for description.

As shown in FIG. 12, when the CLK signal is in the high level, the high-level signal is inverted through the inverter circuit and then converted into a low-level signal, that is, a signal at the node A is the low-level signal. In this case, Q12 is turned off, and Q11 is turned on, so that VGH is transmitted to the node B through Q11. To be specific, a gate voltage of Q14 is the high-level signal, and Q14 is an NMOS transistor, so that Q14 is turned on. In addition, when the signal at the node A is a negative voltage signal VGL and Q15 is a PMOS transistor, Q15 is turned on.

In an example embodiment, Q13 is an NMOS transistor, Q16 is a PMOS transistor, Q17 is an NMOS transistor, and Q18 is a PMOS transistor.

$G_N$ is a pulse signal. At a high-level stage of the pulse signal, Q13 is turned on, and Q16 is turned off. Because Q14 is turned on, VGL is transmitted to the node C through Q13 and Q14. Further, in this case, Q18 is turned on, so that VGH is transmitted to the OUT end through Q18. To be specific, in the high-level period of $G_N$, the OUT end outputs the positive voltage signal VGH.

In a low-level period of $G_N$, Q13 is turned off, and Q16 is turned on. Because Q15 is turned on, VGH is transmitted to the node C through Q15 and Q16, so that Q17 is turned on, and VGL is transmitted to the output end OUT through Q17. To be specific, in the low-level period of $G_N$, the OUT end also outputs the negative voltage signal VGL.

In conclusion, when CLK is in the high-level period, the output end OUT outputs a pulse signal having a frequency the same as that of $G_N$. That is, the OUT end outputs an active row scan signal.

Figure 13:
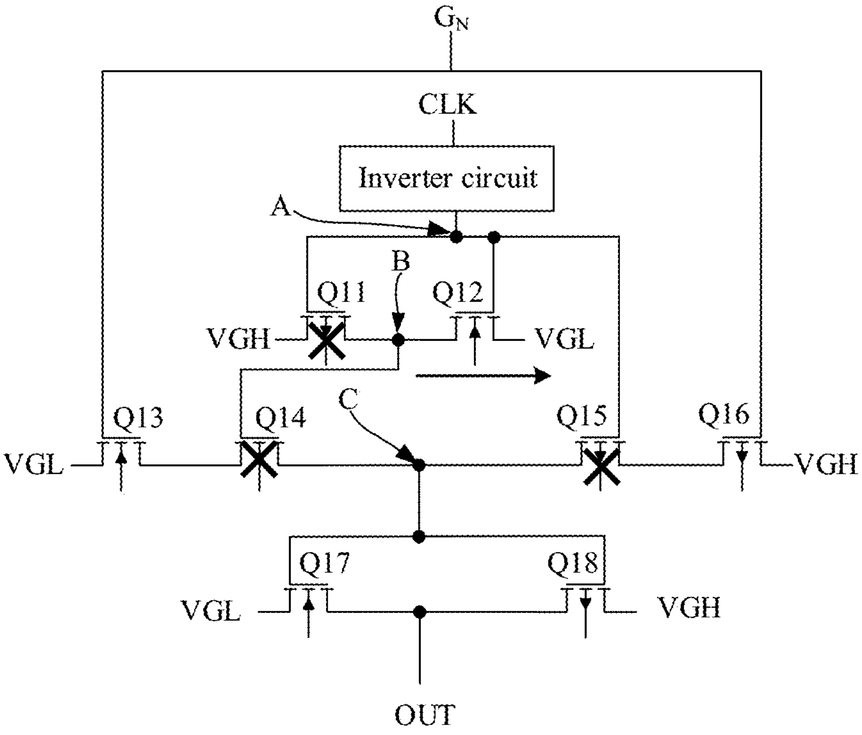
FIG. 13 is an equivalent circuit diagram of the circuit shown in FIG. 11 when a CLK signal is inactive.

FIG. 13 is an equivalent circuit diagram of the N-type output circuit shown in FIG. 11 when the CLK signal is inactive.

In this embodiment, an example in which the CLK signal is active in a high level and the CLK signal is inactive in a low level is still used for description.

As shown in FIG. 13, when CLK is a low-level signal, the low-level signal is inverted through the inverter circuit and then converted into a high-level signal, that is, a signal at the node A is the high-level signal, so that Q11 and Q15 are turned off, and Q12 is turned on. In this case, VGL is transmitted to the node B through Q12, so that Q14 is turned off. Both Q14 and Q15 are turned off, so that the node C is in a floating state, and an output voltage of the OUT end is 0. In other words, when CLK is a low-level signal, the OUT end outputs a low-level signal of 0 V.

When OUT outputs the low-level signal, an N-type TFT that is connected to the OUT end and that is in an OLED panel is turned off, that is, a data signal cannot be written to a pixel circuit. In other words, when OUT outputs the low-level signal, a row scan signal by using the OLED panel in the N-type TFT in inactive.

In conclusion, when CLK is the high-level signal, the OUT end outputs an active row scan signal (that is, a pulse signal), and when CLK is in the low level, the OUT end outputs a constant low-level signal. The diagram of a signal waveform corresponding to respective ends of the N-type output circuit according to this embodiment is the same as that shown in FIG. 6. Details are not described herein again.

For the OLED panel by using the N-type TFT, the low-level signal outputted by the OUT end enables the N-type TFT to be turned off. To be specific, in this case, the data signal cannot be written to a pixel row connected to the OUT end.

Figure 14:
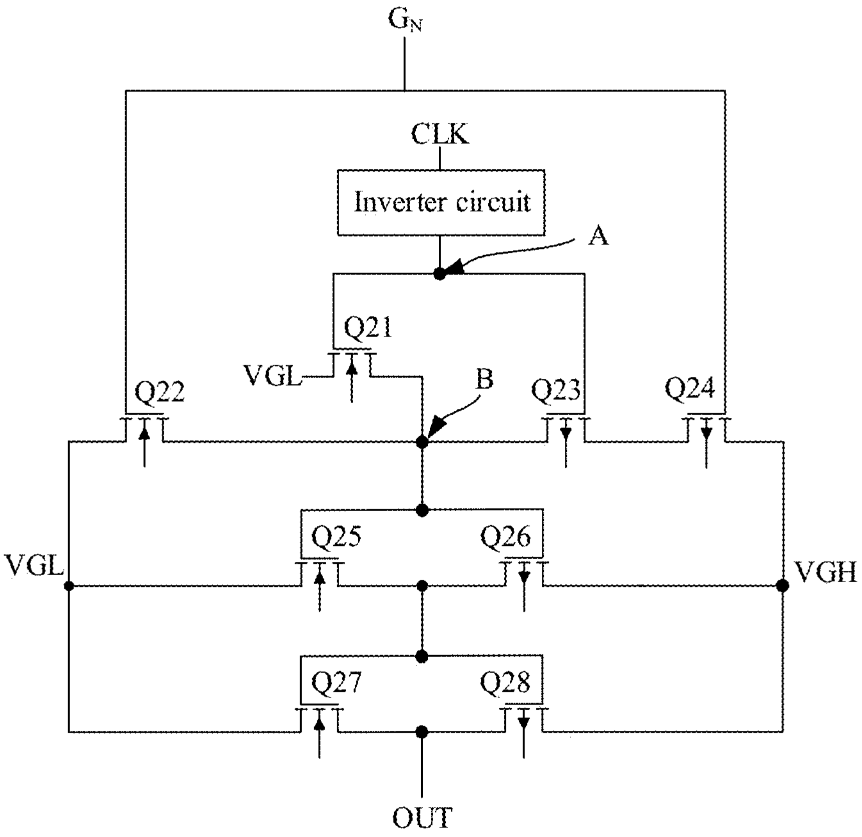
FIG. 14 is a schematic diagram of still another N-type output circuit according to an embodiment of this application.

FIG. 14 is a schematic diagram of still another N-type output circuit according to an embodiment of this application. The N-type output circuit is implemented by using a NOR gate formed by using switching transistors in this embodiment.

As shown in FIG. 14, the N-type output circuit includes a selection circuit formed by Q21 to Q24 and an output circuit formed by Q25 to Q28.

Sources and drains of Q22 to Q24 are sequentially connected in series. A negative voltage signal VGL is inputted to the source of Q22. The drain of Q22 is connected to the drain of Q23. The source of Q23 is connected to the drain of Q24. A positive voltage signal VGH is inputted to the source of Q24.

A negative voltage signal VGL is inputted to the source of Q21. The drain of Q21 is connected to a source-drain common terminal, that is, a node B, of Q22 and Q23.

A gate of Q21 is connected to an output end, that is, a node A, of an inverter circuit, and a row address selection signal CLK is inputted to an input end of the inverter circuit. A row scan signal $G_N$ is inputted to gates of Q22 and Q24.

Q25 and Q26 form a CMOS inverter. Similarly, Q27 and Q28 form a CMOS inverter. A negative voltage signal VGL is inputted to a source of Q25. A drain of Q25 is connected to a drain of Q26. The positive voltage signal VGH is inputted to a source of Q26. A drain common terminal of Q25 and Q26 is connected to gates of Q27 and Q28. A drain common terminal of Q27 and Q28 is an output end OUT of the N-type output circuit.

In addition, the output circuit in this embodiment may include a plurality of CMOS inverters. A quantity of parallel stages of the CMOS inverters is an even number, to ensure that the OUT end outputs a low-level signal when the CLK signal is inactive.

Figure 15:
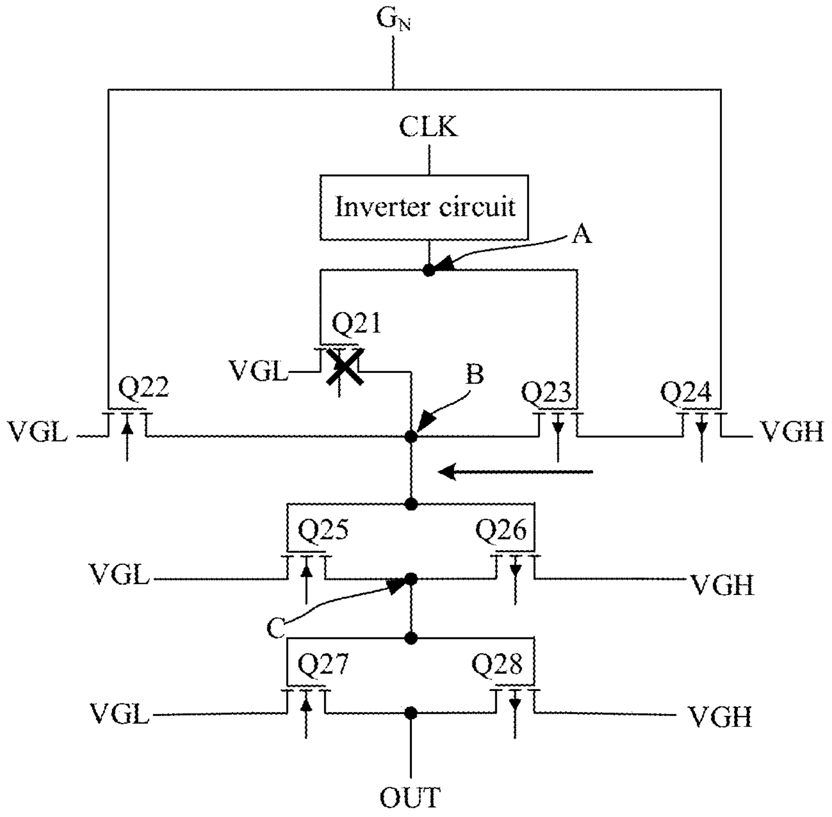
FIG. 15 is an equivalent circuit diagram of the circuit shown in FIG. 14 when a CLK signal is active.

FIG. 15 is an equivalent circuit diagram of the N-type output circuit shown in FIG. 14 when the CLK signal is active.

In this embodiment, an example in which the CLK signal is active in a high level and the CLK signal is inactive in a low level is used for description.

As shown in FIG. 15, when CLK is a high-level signal, the signal passes through the inverter circuit and then the signal is a low-level signal at the node A.

In an example embodiment, Q21 is an NMOS transistor, Q23 is a PMOS transistor. In this case, when a signal at the node A is a low-level signal, Q21 is turned off, and Q23 is turned on.

In an example embodiment, Q22, Q25, and Q27 are NMOS transistors, and Q24, Q26, and Q28 are PMOS transistors.

In a high-level period of $G_N$, Q24 is turned off, Q22 is turned on, and VGL is transmitted to the node B through Q22. When a signal at the node B is a low-level signal, Q26 is turned on, Q25 is turned off, so that VGH is transmitted to the gates of Q27 and Q28 through Q26. That is, a signal at the node C is VGH. In this case, Q27 is turned on, Q28 is turned off, and VGL is transmitted to the output end OUT through Q27.

In a low-level period of $G_N$, Q22 is turned off, Q24 is turned on, and Q23 is always turned on when CLK is in the high level, so that VGH is transmitted to the node B through Q23 and Q24. In this case, Q25 is turned on, and Q26 is turned off. VGL is transmit to the node C through Q25, so that Q28 is turned on, Q27 is turned off, and VGH is transmitted to the output end OUT through Q28.

In conclusion, when CLK is in the high-level period, the OUT end outputs a pulse signal having a frequency the same as that of $G_N$. That is, OUT outputs an active row scan signal.

Figure 16:
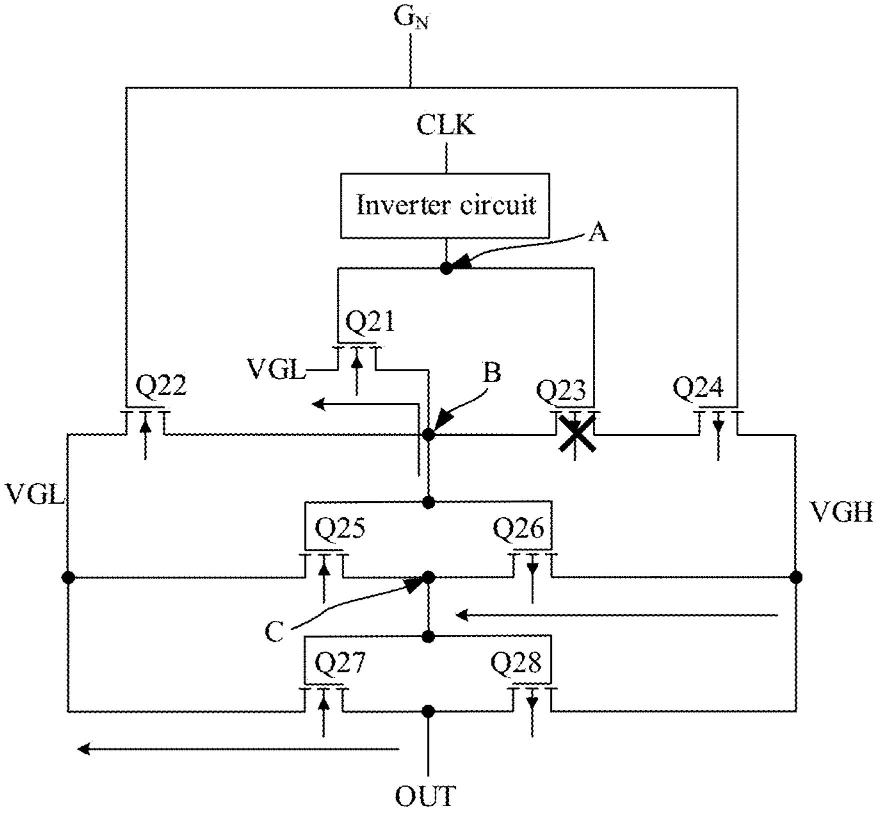
FIG. 16 is an equivalent circuit diagram of the circuit shown in FIG. 14 when a CLK signal is inactive.

FIG. 16 is an equivalent circuit diagram of the circuit shown in FIG. 14 when CLK is inactive.

In this embodiment, an example in which the CLK signal is active in a high level and the CLK signal is inactive in a low level is still used for description.

As shown in FIG. 16, when CLK is a low-level signal, the low-level signal is inverted through the inverter circuit and then converted into a high-level signal, that is, a signal at the node A is the high-level signal, so that Q21 is turned on, Q23 is turned off, and VGL is transmitted to the node B through Q21. A signal at the node B is VGL, so that Q26 is turned on, and VGH is transmit to the node C through Q26. In this case, Q27 is turned on, Q28 is turned off, and finally VGL is transmitted to the output end OUT through Q27. It can be learned that when CLK is in the low level, OUT outputs a constant low-level signal VGL.

Figure 17:
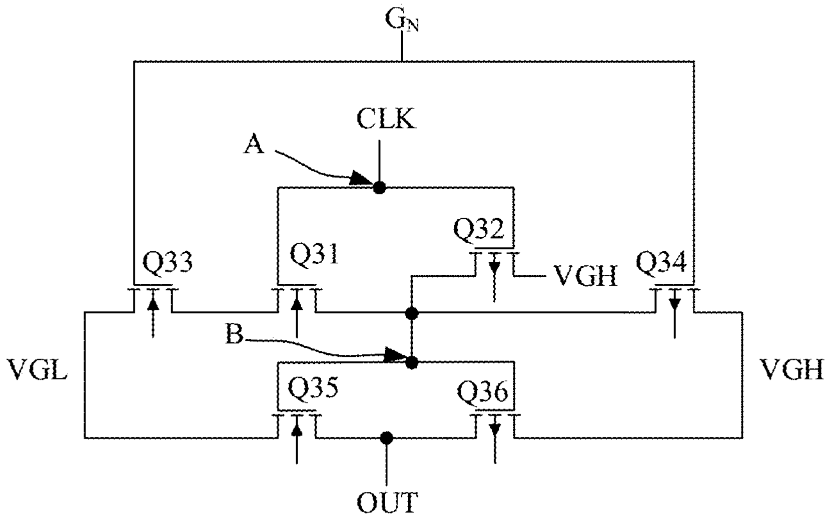
FIG. 17 is a schematic diagram of yet another N-type output circuit according to an embodiment of this application.

FIG. 17 is a schematic diagram of yet another N-type output circuit according to an embodiment of this application. The N-type output circuit is implemented by using a NAND gate formed by using switching transistors in this embodiment.

As shown in FIG. 17, the N-type output circuit includes a selection circuit formed by Q31 to Q34 and an output circuit formed by Q35 and Q36.

In an example embodiment, Q31, Q33, and Q35 are all NMOS transistors, and Q32, Q34, and Q36 are all PMOS transistors.

Sources and drains of Q31, Q33, and Q34 are sequentially connected in series. A negative voltage signal VGL is inputted to the source of Q33. The drain of Q33 is connected to the source of Q31. The drain of Q31 is connected to the drain of Q34. A positive voltage signal VGH is inputted to the source of Q34. A row scan signal $G_N$ is inputted to gates of Q33 and Q34.

A drain of Q32 is connected to a drain common terminal, that is, a node B, of Q31 and Q34. A positive voltage signal VGH is inputted to a source of Q32. A row address selection signal CLK is inputted to gates (that is, a node A) of Q32 and Q31.

Q35 and Q36 form a CMOS inverter. The negative voltage signal VGL is inputted to a source of Q35. A drain of Q35 is connected to a drain of Q36. The positive voltage signal VGH is inputted to a source of Q36. Gates of Q35 and Q36 are connected to the node B. A drain common terminal of Q35 and Q36 is an output end OUT of the N-type output circuit.

Figure 18:
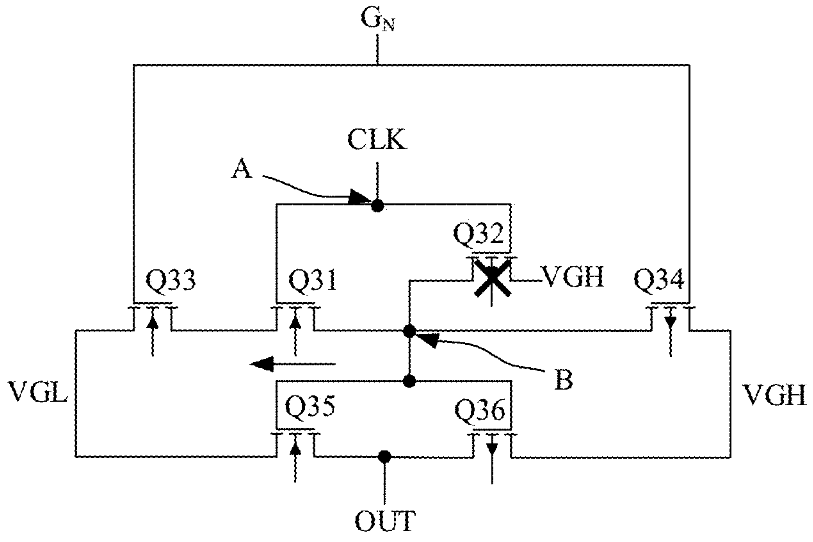
FIG. 18 is an equivalent circuit diagram of the circuit shown in FIG. 17 when a CLK signal is active.

FIG. 18 is an equivalent circuit diagram of the circuit shown in FIG. 17 when the CLK signal is active.

In this embodiment, an example in which the CLK signal is active in a high level and the CLK signal is inactive in a low level is used for description.

As shown in FIG. 18, when CLK is a high-level signal, Q31 is turned on, and Q32 is turned off.

In a high-level period of $G_N$, Q33 is turned on, and Q31 has been turned on, so that VGL is transmitted to the node B through Q33 and Q31. When a signal at the node B is VGL, Q36 is turned on, and Q35 is turned off, so that VGH is transmitted to the output end OUT through Q36. To be specific, in the high-level period of $G_N$, the OUT end outputs the positive voltage signal VGH.

In a low-level period of $G_N$, Q34 is turned on, and Q33 is turned off, so that the positive voltage signal VGH is transmitted to the node B through Q34. When a signal at the node B is VGH, Q35 is turned on, and Q36 is turned off, so that VGL is transmitted to the output end OUT through Q35. To be specific, in the low-level period of $G_N$, the OUT end outputs the negative voltage signal VGL.

In conclusion, when CLK is in the high-level period, the OUT end outputs a pulse signal having a frequency the same as that of $G_N$. That is, OUT outputs an active row scan signal.

Figure 19:
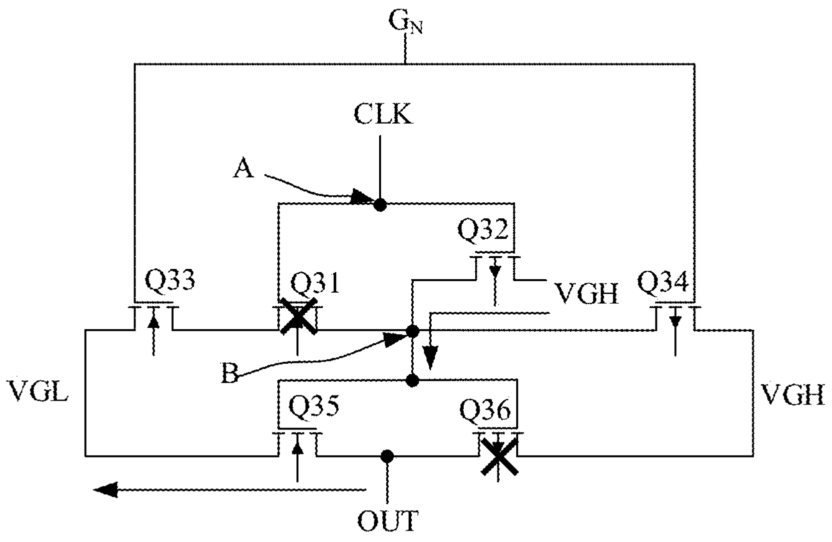
FIG. 19 is an equivalent circuit diagram of the circuit shown in FIG. 17 when a CLK signal is inactive.

FIG. 19 is an equivalent circuit diagram of the circuit shown in FIG. 17 when the CLK signal is inactive.

In this embodiment, an example in which the CLK signal is active in a high level and the CLK signal is inactive in a low level is still used for description.

As shown in FIG. 19, when the CLK signal is a low-level signal, Q31 is turned off, and Q32 is turned on, so that VGH is transmitted to the node B through Q32. When a signal at the node B is VGH, Q35 is turned on, and Q36 is turned off, so that VGL is transmitted to the output end OUT through Q35. In other words, when CLK is a low-level signal, the OUT end outputs a constant negative voltage signal VGL.

In conclusion, in the N-type output circuit shown in FIG. 17, when CLK is a high-level signal, the OUT end output a pulse signal that is the same as the $G_N$ signal, that is, an active row scan signal. When CLK is the low-level signal, the OUT end outputs a constant low-level signal.

According to another aspect, this application further provides an OLED screen. The OLED screen includes the OLED screen driving circuit structure shown in FIG. 5 and an integrated circuit having a memory (for example, a DDIC or a high-frequency clock integrated circuit).

An effective display region of the OLED screen is divided into at least two different working partitions. The row driving circuit and a column driving circuit coordinate with the DDIC to identify displayed data to be updated (that is, Δdata), to determine pixels included in different working partitions.

Each working partition can separately refresh displayed content, for example, refresh the displayed content at a different refresh rate. For example, the N-type output circuit may select a plurality of working partitions with different refresh rates on the OLED screen, for example, a fundamental frequency region, a first multiplied frequency region, a second multiplied frequency region, and the like. For example, a refresh rate of the fundamental frequency region is kept at a lowest frequency for maintaining display, for example, 0.5 Hz. A refresh rate of the first multiplied frequency region is slightly higher than that of the fundamental frequency region, and the first multiplied frequency region may be used for displaying content with a high refresh requirement, such as a chat window or a static background. For example, the refresh rate may be 30 Hz. The second multiplied frequency region displays content with a higher refresh requirement, such as a message pop-up window or a quick preview window. For example, a refresh rate may be 60 Hz, 90 Hz, or even 120 Hz.

Figure 20:
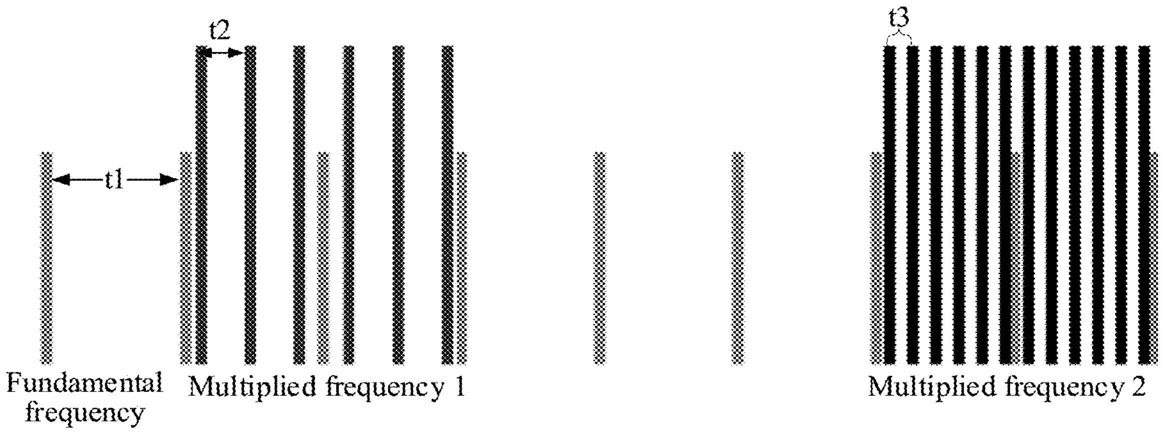
FIG. 20 is a schematic diagram of a comparison between refresh rates of a fundamental frequency region and a multiplied frequency region according to an embodiment of this application.

FIG. 20 is a schematic diagram of a comparison between refresh rates of a fundamental frequency region and a multiplied frequency region.

As shown in FIG. 20, a refresh time interval of a fundamental frequency is t1, a refresh time interval of multiplied frequency 1 is t2, and a refresh time interval of multiplied frequency 2 is t3, and it can be learned that t1>t2>t3. Therefore, a refresh rate of the multiplied frequency 1 is greater than a refresh rate of the fundamental frequency and is less than a refresh rate of the multiplied frequency 2.

In addition, after the fundamental frequency acts on the effective display region of the entire display screen, that is, after the effective display region is divided into a plurality of working partitions with different refresh rates, each partition may be refreshed at a refresh rate corresponding to its respective partition, and may also be refreshed at the refresh rate corresponding to the fundamental frequency.

In addition, the working partitions are dynamically adjusted based on change data (Δdata) of the displayed content, that is, positions of the working partitions on the display screen are unfixed. In addition, an operation unit of a row driving circuit in each working partition may be a single sub-pixel (for example, an R-type OLED, a G-type OLED, or a B-type OLED), or may be a quasi-pixel (for example, an RB-type OLED) formed by a plurality of sub-pixels.

Figure 21:
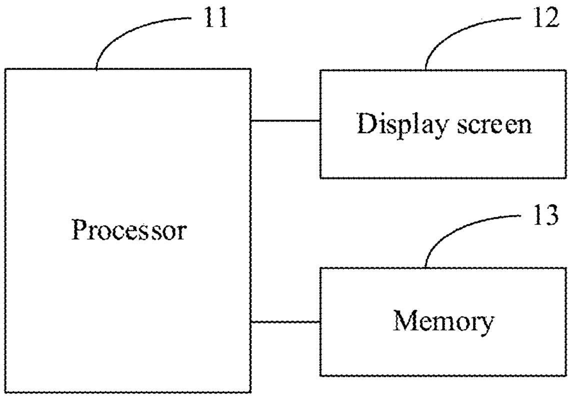
FIG. 21 is a schematic diagram of a structure of an electronic device according to an embodiment of this application.

According to still another aspect, an embodiment of this application further provides an electronic device. As shown in FIG. 21, the electronic device may include a processor 11, a display screen 12, and a memory 13.

It may be understood that the structure shown in this embodiment constitutes no specific limitation on the electronic device. In some other embodiments, the electronic device may include more or fewer components than those shown in the figure, or combine some components, or split some components, or have different component arrangements. The foregoing components may be implemented by using hardware, software, or a combination of software and hardware.

The memory 13 may be configured to store computer-executable program code, and the executable program code includes instructions.

The processor 11 invokes and runs the instructions stored in the memory 13, so that the electronic device executes various function applications and data processing.

The display screen 12 is configured to display images, videos, and the like. The display screen 12 includes a display panel. The display panel may use the OLED screen provided in embodiments of this application, or certainly may use another type of display panel. This is not limited in this application.

In some embodiments, the electronic device may include one or N display screens 12. N is a positive integer greater than 1.

Through the descriptions of the foregoing implementations, a person skilled in the art may clearly understand that for the purpose of convenient and brief description, only division of the foregoing functional modules is used as an example for description. During actual application, the functions may be allocated to and completed by different functional modules based on a requirement. In other words, an internal structure of the apparatus is divided into different functional modules, to complete all or some of the functions described above. For a specific work process of the system, apparatus, and unit described above, refer to a corresponding process in the foregoing method embodiments. Details are not described herein again.

In the several embodiments provided in this embodiment, it should be understood that the disclosed system, apparatus, and method may be implemented in other manners. For example, the foregoing apparatus embodiment is merely an example. For example, the module or unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate components may or may not be physically separated, and the components displayed as units may or may not be physical units, that is, may be located in one place or may be distributed over a plurality of network units. Some or all of the units may be selected according to actual needs to achieve the objectives of the solutions of embodiments.

In addition, functional units in embodiments of this embodiment may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of embodiments essentially, or the part contributing to the related art, or all or some of the technical solutions may be implemented in the form of a software product. The computer software product is stored in a storage medium and includes several instructions for instructing a computer device (which may be a personal computer, a server, a network device, or the like) or a processor to perform all or some of steps of the method described in embodiments. The foregoing storage medium includes any medium that can store program code, such as a flash memory, a removable hard disk, a read-only memory, a random access memory, a magnetic disk, or a compact disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A driving signal output circuit, used in a display screen, wherein the display screen comprises a pixel array and an array driving circuit, the array driving circuit comprises a row scan driving circuit, and the row scan driving circuit generates a row scan signal for driving a pixel row in the pixel array;

wherein an input end of the driving signal output circuit is connected to an output end of the row scan driving circuit, a control end of the driving signal output circuit receives a row address selection signal, and the row scan signal is inputted to the input end of the driving signal output circuit;

wherein when the row address selection signal is active, the driving signal output circuit outputs the row scan signal, and the row address selection signal is generated, based on the pixel row having a changed display state, by an integrated circuit that has a memory and that is coupled to the display screen;

wherein when the row address selection signal is inactive, the driving signal output circuit outputs a low-level signal;

wherein the driving signal output circuit comprises a selection circuit and an output circuit;

wherein an input end of the selection circuit is connected to the output end of the row scan driving circuit, a control end of the selection circuit receives the row address selection signal, an output end of the selection circuit is connected to an input end of the output circuit, the selection circuit is configured to: output a pulse signal having a frequency the same as that of the row scan signal when the row address selection signal is active; and output a constant-level signal when the row address selection signal is inactive;

wherein the output circuit is configured to: generate a write driving signal having a driving capability based on the pulse signal and output the write driving signal, or output a constant negative voltage signal based on the constant-level signal;

wherein the selection circuit comprises a load circuit and a signal latch circuit, and the load circuit comprises a first voltage division bridge arm and a second voltage division bridge arm;

wherein the row address selection signal is inputted to an input end of the signal latch circuit, and a signal of an output end of the signal latch circuit is held as the signal inputted from the input end of the signal latch circuit; and wherein the first voltage division bridge arm has one end to which a positive voltage signal is inputted and another end that is connected to the output end of the signal latch circuit, the second voltage division bridge arm is connected in parallel to the first voltage division bridge arm, a common node of an upper transistor and a lower transistor of the second voltage division bridge arm is connected to the input end of the output circuit, and the row scan signal is inputted to a control terminal of the lower transistor.

2. The driving signal output circuit according to claim 1, wherein the first voltage division bridge arm comprises a first switching transistor and a third switching transistor that are connected in series, a first terminal of the first switching transistor is connected to a second terminal of the third switching transistor, a positive voltage signal is inputted to a second terminal of the first switching transistor, a control terminal of the first switching transistor is connected to the first terminal of the first switching transistor, and a first voltage signal is inputted to a control terminal of the third switching transistor; and the second voltage division bridge arm comprises a second switching transistor and a fourth switching transistor that are connected in series, a first terminal of the second switching transistor is connected to a second terminal of the fourth switching transistor, a control terminal of the second switching transistor is connected to the control terminal of the first switching transistor, a first terminal of the fourth switching transistor is connected to a first terminal of the third switching transistor, the row scan signal is inputted to a control terminal of the fourth switching transistor, and a common terminal of the second switching transistor and the fourth switching transistor is connected to the input end of the output circuit.

3. The driving signal output circuit according to claim 1, wherein the signal latch circuit comprises a first series branch and a second branch;

the first branch comprises a fifth switching transistor and a sixth switching transistor that are connected in series, the row address selection signal is inputted to gates of the fifth switching transistor and the sixth switching transistor, a series common node of the fifth switching transistor and the sixth switching transistor is the output end of the signal latch circuit, a positive voltage signal is inputted to a first terminal of the fifth switching transistor, and a negative voltage signal is inputted to a first terminal of the sixth switching transistor; and the second branch comprises a seventh switching transistor and an eighth switching transistor that are connected in series, a series common node of the seventh switching transistor and the eighth switching transistor is connected to the gates of the fifth switching transistor and the sixth switching transistor, gates of the seventh switching transistor and the eighth switching transistor are connected to the output end of the signal latch circuit, the positive voltage signal is inputted to a first terminal of the seventh switching transistor, and the negative voltage signal is inputted to a first terminal of the eighth switching transistor.

4. The driving signal output circuit according to claim 1, wherein the output circuit comprises at least one stage of output unit comprising a CMOS inverter, and a quantity of stages of the output units is an odd number.

5. The driving signal output circuit according to claim 4, wherein the output unit comprises a twenty-third switching transistor and a twenty-fourth switching transistor that are connected in series, control terminals of the twenty-third switching transistor and the twenty-fourth switching transistor are connected to the output end of the selection circuit, and a series common node of the twenty-third switching transistor and the twenty-fourth switching transistor is an output end of the output circuit; and a positive voltage signal is inputted to a first terminal of the twenty-third switching transistor, and a negative voltage signal is inputted to a first terminal of the twenty-fourth switching transistor.

6. The driving signal output circuit according to claim 1, wherein the row address selection signal is active when the row address selection signal is a high-level signal, and is inactive when the row address selection signal is a low-level signal.

7. The driving signal output circuit according to claim 1, wherein the integrated circuit is a display driver integrated circuit (DDIC).

8. A display screen, comprising a pixel array, a pixel driving circuit, an array driving circuit, and a driving signal output circuit, wherein the array driving circuit comprises a row scan driving circuit, and the row scan driving circuit generates a row scan signal for driving a pixel row in the pixel array;

an input end of the driving signal output circuit is connected to an output end of the row scan driving circuit, a control end of the driving signal output circuit receives a row address selection signal, and the row scan signal is inputted to the input end of the driving signal output circuit;

when the row address selection signal is active, the driving signal output circuit outputs the row scan signal, and the row address selection signal is generated, based on the pixel row having a changed display state, by an integrated circuit that has a memory and that is coupled to the display screen; and when the row address selection signal is inactive, the driving signal output circuit outputs a low-level signal;

wherein the driving signal output circuit comprises a selection circuit and an output circuit;

an input end of the selection circuit is connected to the output end of the row scan driving circuit, a control end of the selection circuit receives the row address selection signal, an output end of the selection circuit is connected to an input end of the output circuit, the selection circuit is configured to: output a pulse signal having a frequency the same as that of the row scan signal when the row address selection signal is active; and output a constant-level signal when the row address selection signal is inactive; and the output circuit is configured to: generate a write driving signal having a driving capability based on the pulse signal and output the write driving signal, or output a constant negative voltage signal based on the constant-level signal;

a horizontal scan line of the pixel driving circuit is coupled to the driving signal output circuit, a data line of the pixel driving circuit is coupled to a column driving circuit, and the pixel driving circuit is configured to control display states of a part of pixels in the pixel array based on the row scan signal and a data signal;

wherein the selection circuit comprises a first inverter circuit, a third branch, and a fourth branch;

the row address selection signal is inputted to an input end of the first inverter circuit, and an output end of the first inverter circuit is connected to a control end of the third branch; and the third branch comprises a ninth switching transistor and a tenth switching transistor that are connected in series, control terminals of the ninth switching transistor and the tenth switching transistor are the control end of the third branch, a positive voltage signal is inputted to a first terminal of the ninth switching transistor, and a negative voltage signal is inputted to a first terminal of the tenth switching transistor; and the fourth branch comprises an eleventh switching transistor, a twelfth switching transistor, a thirteenth switching transistor, and a fourteenth switching transistor that are sequentially connected in series, a negative voltage signal is inputted to a first terminal of the eleventh switching transistor, a positive voltage signal is inputted to a first terminal of the fourteenth switching transistor, the row scan signal is inputted to control terminals of the eleventh switching transistor and the fourteenth switching transistor, a control terminal of the twelfth switching transistor is connected to a series common terminal of the ninth switching transistor and the tenth switching transistor, and a control terminal of the thirteenth switching transistor is connected to the output end of the first inverter circuit.

9. The display screen according to claim 8, wherein the output circuit comprises a fifteenth transistor and a sixteenth transistor, and an input of the output circuit is connected to a common terminal of the twelfth switching transistor and the thirteenth switching transistor.

10. The display screen according to claim 9, therein the input of the output circuit is a control terminal of the fifteenth transistor and a control terminal of the sixteenth transistor.

11. The display screen according to claim 9, wherein a first terminal of the fifteenth transistor is connected to a negative voltage signal and a first terminal of the sixteenth transistor is connected to a positive voltage signal.

12. The display screen according to claim 8, wherein the integrated circuit is a display driver integrated circuit (DDIC).

13. An electronic device, wherein the electronic device comprises: one or more processors, a memory, and a display screen, wherein the display screen comprises a pixel array, a pixel driving circuit, an array driving circuit, and a driving signal output circuit, wherein the array driving circuit comprises a row scan driving circuit, and the row scan driving circuit generates a row scan signal for driving a pixel row in the pixel array;

an input end of the driving signal output circuit is connected to an output end of the row scan driving circuit, a control end of the driving signal output circuit receives a row address selection signal, and the row scan signal is inputted to the input end of the driving signal output circuit;

when the row address selection signal is active, the driving signal output circuit outputs the row scan signal, and the row address selection signal is generated, based on the pixel row having a changed display state, by an integrated circuit that has a memory and that is coupled to the display screen;

when the row address selection signal is inactive, the driving signal output circuit outputs a low-level signal;

the driving signal output circuit comprises a selection circuit and an output circuit;

an input end of the selection circuit is connected to the output end of the row scan driving circuit, a control end of the selection circuit receives the row address selection signal, an output end of the selection circuit is connected to an input end of the output circuit, the selection circuit is configured to: output a pulse signal having a frequency the same as that of the row scan signal when the row address selection signal is active; and output a constant-level signal when the row address selection signal is inactive;

the output circuit is configured to: generate a write driving signal having a driving capability based on the pulse signal and output the write driving signal, or output a constant negative voltage signal based on the constant-level signal;

a horizontal scan line of the pixel driving circuit is coupled to the driving signal output circuit, a data line of the pixel driving circuit is coupled to a column driving circuit, and the pixel driving circuit is configured to control display states of a part of pixels in the pixel array based on the row scan signal and a data signal;

the selection circuit comprises a load circuit and a signal latch circuit, and the load circuit comprises a first voltage division bridge arm and a second voltage division bridge arm;

the row address selection signal is inputted to an input end of the signal latch circuit, and a signal of an output end of the signal latch circuit is held as the signal inputted from the input end of the signal latch circuit; and the first voltage division bridge arm has one end to which a positive voltage signal is inputted and another end that is connected to the output end of the signal latch circuit, the second voltage division bridge arm is connected in parallel to the first voltage division bridge arm, a common node of an upper transistor and a lower transistor of the second voltage division bridge arm is connected to the input end of the output circuit, and the row scan signal is inputted to a control terminal of the lower transistor.

14. The electronic device according to claim 13, wherein the first voltage division bridge arm comprises a first switching transistor and a third switching transistor that are connected in series, a first terminal of the first switching transistor is connected to a second terminal of the third switching transistor, a positive voltage signal is inputted to a second terminal of the first switching transistor, a control terminal of the first switching transistor is connected to the first terminal of the first switching transistor, and a first voltage signal is inputted to a control terminal of the third switching transistor; and the second voltage division bridge arm comprises a second switching transistor and a fourth switching transistor that are connected in series, a first terminal of the second switching transistor is connected to a second terminal of the fourth switching transistor, a control terminal of the second switching transistor is connected to the control terminal of the first switching transistor, a first terminal of the fourth switching transistor is connected to a first terminal of the third switching transistor, the row scan signal is inputted to a control terminal of the fourth switching transistor, and a common terminal of the second switching transistor and the fourth switching transistor is connected to the input end of the output circuit.

15. The electronic device according to claim 13, wherein the signal latch circuit comprises a first branch and a second branch;

the first branch comprises a fifth switching transistor and a sixth switching transistor that are connected in series, the row address selection signal is inputted to gates of the fifth switching transistor and the sixth switching transistor, a series common node of the fifth switching transistor and the sixth switching transistor is the output end of the signal latch circuit, a positive voltage signal is inputted to a first terminal of the fifth switching transistor, and a negative voltage signal is inputted to a first terminal of the sixth switching transistor; and the second branch comprises a seventh switching transistor and an eighth switching transistor that are connected in series, a series common node of the seventh switching transistor and the eighth switching transistor is connected to the gates of the fifth switching transistor and the sixth switching transistor, gates of the seventh switching transistor and the eighth switching transistor are connected to the output end of the signal latch circuit, the positive voltage signal is inputted to a first terminal of the seventh switching transistor, and the negative voltage signal is inputted to a first terminal of the eighth switching transistor.

16. The electronic device according to claim 13, wherein the output circuit comprises at least one stage of output unit comprising a CMOS inverter, and a quantity of stages of the output units is an odd number.

17. The electronic device according to claim 16, wherein the at least one stage of output unit comprises a twenty-third switching transistor and a twenty-fourth switching transistor that are connected in series, control terminals of the twenty-third switching transistor and the twenty-fourth switching transistor are connected to the output end of the selection circuit, and a series common node of the twenty-third switching transistor and the twenty-fourth switching transistor is an output end of the output circuit; and a positive voltage signal is inputted to a first terminal of the twenty-third switching transistor, and a negative voltage signal is inputted to a first terminal of the twenty-fourth switching transistor.

18. The electronic device according to claim 13, wherein the row address selection signal is active when the row address selection signal is a high-level signal, and is inactive when the row address selection signal is a low-level signal.

19. The electronic device according to claim 13, wherein the integrated circuit is a display driver integrated circuit (DDIC).

* * * * *